US012769552B2

(12) United States Patent
Wang et al.

(10) Patent No.: US 12,769,552 B2
(45) Date of Patent: Oct. 20, 2026

(54) MACHINE-LEARNED MODEL ALIGNMENT WITH SYNTHETIC DATA

(71) Applicant: Google LLC, Mountain View, CA (US)

(72) Inventors: Zifeng Wang, Los Angeles, CA (US); Vincent Perot, Brooklyn, NY (US); Long Thanh Le, Sunnyvale, CA (US); Jin Miao, San Jose, CA (US); Zizhao Zhang, Santa Clara, CA (US); Chen-Yu Lee, Cupertino, CA (US); Tomas Jon Pfister, Redwood City, CA (US); Chun-Liang Li, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 19/055,348

(22) Filed: Feb. 17, 2025

(65) Prior Publication Data

US 2025/0265087 A1 Aug. 21, 2025

Related U.S. Application Data

(60) Provisional application No. 63/554,545, filed on Feb. 16, 2024.

(51) Int. Cl.
*G06F 9/30* (2018.01)
*G06N 20/00* (2019.01)

(52) U.S. Cl.
CPC ......... *G06F 9/30192* (2013.01); *G06N 20/00* (2019.01)

(58) Field of Classification Search
CPC ............................ G06F 9/30192; G06N 20/00
See application file for complete search history.

(56) References Cited

U.S. PATENT DOCUMENTS

2022/0084510 A1* 3/2022 Peng ..................... G10L 15/063
2023/0377324 A1* 11/2023 Kim ....................... G06V 10/82
(Continued)

OTHER PUBLICATIONS

Yue Huang et al. "ChemOrch: Empowering LLMs with Chemical Intelligence via Synthetic Instructions" 39th Conference on Neural Information Processing Systems (NeurIPS 2025). (Year: 2025).*
(Continued)

*Primary Examiner* — Jacob Petranek
(74) *Attorney, Agent, or Firm* — DORITY & MANNING, P.A.

(57) ABSTRACT

Aspects of the disclosed technology include computer-implemented systems and methods for adapting machine-learned models using high-quality synthetic data that is tailored to elicit improved instruction-following abilities for particular target instruction distributions and models. A model adaptation system can obtain instruction metadata indicative of at least one use case and at least one skill associated with a particular computing task to be performed by a target machine-learned model. The system can generate a metadata-conditioned synthetic instruction by prompting a generative model system including one or more machine-learned generative models with the instruction metadata as one or more constraints. The system can generate a model response by prompting the generative model system with the metadata-conditioned synthetic instruction. The system can modify a target sequence processing model based at least in part on a data pair including the metadata-conditioned synthetic instruction and the model response.

19 Claims, 23 Drawing Sheets

200

(56) References Cited

U.S. PATENT DOCUMENTS

| | | | | |
|---|---|---|---|---|
| 2025/0069309 | A1* | 2/2025 | Lyle | G06T 13/40 |
| 2025/0124332 | A1* | 4/2025 | Nakamura Sakai | G06N 5/01 |
| 2025/0131363 | A1* | 4/2025 | O Conchuir | G06N 3/042 |
| 2025/0238340 | A1* | 7/2025 | Jain | G06F 40/35 |
| 2025/0390286 | A1* | 12/2025 | Majumdar | G06F 8/35 |

OTHER PUBLICATIONS

Mihai Nadas et al. "Synthetic Data Generation Using Large Language Models: Advances in Text and Code" (Year: 2025).*
Anil et al., "PaLM 2 Technical Report", arXiv:2305.10403v3, Sep. 13, 2023, 93 pages.
Aribandi et al., "ExT5: Towards Extreme Multi-Task Scaling for Transfer Learning", arXiv:2111.10952v2, Jan. 29, 2022, 28 pages.
Bai et al., "Training a Helpful and Harmless Assistant with Reinforcement Learning from Human Feedback", arXiv:2204.058862v1, Apr. 12, 2022, 74 pages.
Bair, "Koala: A Dialogue Model for Academic Research", Apr. 3, 2023, https://bair.berkeley.edu/blog/2023/04/03/koala/, retrieved on Mar. 12, 2026, 6 pages.
Bender et al., "On the Dangers of Stochastic Parrots: Can Language Models Be Too Big?", 2021 Association for Computing Machinery Conference on Fairness, Accountability, and Transparency, Virtual, Mar. 3-10, 2021, 15 pages.
Beyer et al., "Knowledge Distillation: A Good Teacher is Patent and Consistent", 2022 IEEE/CVF Conference on Computer Vision and Pattern Recognition, New Orleans, Louisiana, United States, Jun. 18-24, 2022, 10 pages.
Brown et al., "Language Models are Few-Shot Learners", arXiv:2005.14165v4, Jul. 22, 2020, 75 pages.
Chen et al., "AlpaGasus: Training A Better Alpaca with Fewer Data", arXiv:2307.08701v5, Feb. 13, 2024, 31 pages.
Chen et al., "Mixture of Soft Prompts for Controllable Data Generation", arXiv:2303.01580v2, Oct. 18, 2023, 19 pages.
Chung et al., "Scaling Instruction-Finetuned Language Models", arXiv:2210.11416v5, Dec. 6, 2022, 54 pages.
Dong et al., "SteelLM: Attribute Conditioned SFT as an (User-Steerable) Alternative to RLHF", arXiv:2310.05344v1, Oct. 9, 2023, 14 pages.
Dubois et al., "AlpacaFarm: A Simulation Framework for Methods that Learn from Human Feedback", arXiv:2305.14387v4, Jan. 8, 2024, 31 pages.
Efrat et al., "The Turking Test: Can Language Models Understand Instructions?", arXiv:2010.11982vl, Oct. 22, 2020, 12 pages.
Fernando et al., "Promptbreeder: Self-Referential Self-Improvement Via Prompt Evolution", arXiv:2309.16797v1, Sep. 28, 2023, 64 pages.
Gallegos et al., "Bias and Fairness in Large Language Models: A Survey", arXiv:2309.00770v3, Jul. 12, 2024, 79 pages.
Gemini Team, "Gemini: A Family of Highly Capable Multimodal Models", arXiv:2312.11805v5, May 9, 2025, 90 pages.
Github, "tatsu-lab/stanford_alpaca", May 30, 2023, https://github.com/tatsu-lab/stanford_alpaca, retrieved on Mar. 16, 2026, 6 pages.
Github, "unitaryai/detoxify", Jul. 29, 2025, https://github.com/unitaryai/detoxify/commits/master/, retrieved on Mar. 16, 2026, 6 pages.
Hendrycks et al., "Measuring Massive Multitask Language Understanding", arXiv:2009.03300v3, Jan. 12, 2021, 27 pages.
Hinton et al., "Distilling the Knowledge in a Neural Network", arXiv:1503.02531v1, Mar. 9, 2015, 9 pages.
Honovich et al., "Unnatural Instructions: Tuning Language Models with (Almost) No Human Labor", arXiv:2212.09689v1, Dec. 19, 2022, 18 pages.
Hsieh et al., "Distilling Step-by-Step! Outperforming Larger Language Models with Less Training Data and Smaller Model Sizes", arXiv:2305.02391v2, Jul. 5, 2023, 13 pages.
Jain et al., Baseline Defenses for Adversarial Attacks Against Aligned Language Models', arXiv:2309.00614v2. Sep. 4, 2023, 19 pages.
Kingma et al., "Auto-Encoding Variational Bayes", arXiv:1312.6114v11, Dec. 10, 2022, 14 pages.
Kopf et al., "OpenAssistant Conversations—Democratizing Large Language Model Alignment", arXiv:2304.07327v2, Oct. 31, 2023, 34 pages.
Kramer, "Nonlinear Principal Component Analysis Using Autoassociative Neural Networks", American Institute of Chemical Engineers, vol. 37, No. 2, Feb. 1991, pp. 233-243.
Lee et al., "Applying Large Language Models and Chain-of-Thought for Automatic Scoring", arXiv:2312.03748v2, Feb. 16, 2024, 48 pages.
Li et al., "Contrastive Decoding: Open-Ended Text Generation as Optimization", arXiv:2210.15097v2, Jul. 10, 2023, 25 pages.la.
Li et al., "Self-Alignment with Instruction Backtranslation", arXiv:2308.06259v3, Mar. 12, 2024, 26 pages.
Liang et al., "Less is More: Task-Aware Layer-Wise Distillation for Language Model Compression", Fortieth International Conference on Machine Learning, Honolulu, Hawaii, United States, Jul. 23-29, 2023, 16 pages.
Liu et al., "Prompt Injection attack against LLM-integrated Applications", arXiv:2306.05499v3, Dec. 29, 2025, 18 pages.
Liu et al., "WANLI: Worker and AI Collaboration for Natural Language Inference Dataset Creation", arXiv:2201.05955v5, Nov. 15, 2022, 22 pages.
LMSYS Org, "Vicua: An Open-Source Chatbot Impressing GPT-4 with 90%* ChatGPT Quality", Mar. 30, 2023, https://lmsys.org/blog/2023-03-30-vicuna/, retrieved on Mar. 12, 2026, 8 pages.
Madaan et al., "Self-Refine: Iterative Refinement with Self-Feedback", arXiv:2303.17651v2, May 25, 2023, 54 pages.
Meng et al., "Tuning Language Models as Training Data Generators for Augmentation-Enhanced Few-Shot Learning", Fortieth International Conference on Machine Learning, Honolulu, Hawaii, United States, Jul. 23-29, 2023, 21 pages.
Open AI, "GPT-4 Technical Report", arXiv:2303.08774v6, Mar. 4, 2024, 100 pages.
OpenAI, "Introducing GPTs", Nov. 6, 2023, https://openai.com/index/introducing-gpts/, retrieved on Mar. 16, 2026, 6 pages.
Ouyang et al., "Training Language Models to Follow Instructions with Human Feedback". Thirty-Sixth Conference on Neural Information Processing Systems, New Orleans, Louisiana United States, Nov. 28-Dec. 9, 2022, 15 pages.
Peng et al., "Instruction Tuning with GPT-4", arXiv:2304.03277v1, Apr. 6, 2023, 12 pages.
Raffel et al., "Exploring the Limits of Transfer Learning with a Unified Text-to-Text Transformer", The Journal of Machine Learning Research, vol. 21, Issue 1, Jan. 1, 2020, 68 pages.
Sanh et al., "Multitask Prompted Training Enables Zero-Shot Task Generalization", Tenth International Conference on Learning Representations, Virtual, Apr. 25-29, 2022, 216 pages.
Schick et al., "Generating Datasets with Pretrained Language Models", arXiv:2104.07540v3, Oct. 4, 2021, 9 pages.
Suzgun et al., "Challenging BIG-Bench Tasks and Whether Chain-of-Thought Can Solve Them", arXiv:2210.09261v1, Oct. 17, 2022, 49 pages.
Thakur et al., "Language Models Get A Gender Makeover: Mitigating Gender Bias with Few-Shot Data Interventions", arXiv:2306.04597v1, Jun. 7, 2023, 10 pages.
Touvron et al., "LLaMA: Open and Efficient Foundation Language Models", arXiv:2302.13971v1, Feb. 27, 2023, 27 pages.
Wang et al., "CodecLM: Aligning Language Models with Tailored Synthetic Data", arXiv:2404.05875v1, Apr. 8, 2024, 18 pages.
Wang et al., "How Far Can Camels Go? Exploring the State of Instruction Tuning on Open Resources", arXiv:2306.04751v2, Oct. 30, 2023, 23 pages.
Wang et al., "Self-Instruct: Aligning Language Models with Self-Generated Instructions", arXiv:2212.10560v2, May 25, 2023, 23 pages.
Wei et al., "Chain-of-Thought Prompting Elicits Reasoning in Large Language Models", Thirty-Sixth Conference on Neural Information Processing Systems, New Orleans, Louisiana United States, Nov. 28-Dec. 9, 2022, 14 pages.
Wei et al., "Finetuned Language Models Are Zero-Shot Learners", arXiv:2109.01652v5, Feb. 8, 2022, 46 pages.

(56) References Cited

OTHER PUBLICATIONS

Xu et al., "WizardLM: Empowering Large Pre-Trained Language Models to Follow Complex Instructions", arXiv:2304.12244v3, May 27, 2025, 22 pages.
Yang et al., "Large Language Models as Optimizers", arXiv:2309.03409v3, Apr. 15, 2024, 42 pages.
Yu et al., "Large Language Model as Attributed Training Data Generator: A Tale of Diversity and Bias", arXiv:2306.15895v2, Oct. 18, 2023, 45 pages.
Zhao et al., "A Preliminary Study of the Intrinsic Relationship Between Complexity and Alignment", arXiv:2308.05696v1, Aug. 10, 2023, 12 pages.
Zheng et al., "Judging LLM-As-A-Judge with MT-Bench and Chatbot Arena", arXiv:2306.05685v4, Dec. 24, 2023, 29 pages.
Zhou et al., "Instruction-Following Evaluation for Large Language Models", arXiv:2311.07911vl, Nov. 14, 2023, 43 pages.
Zhou et al., "LIMA: Less Is More for Alignment", arXiv:2305.11206v1, May 18, 2023, 15 pages.
Zou et al., "Universal and Transferable Adversarial Attacks on Aligned Language Models", arXiv:2307.15043v2, Dec. 20, 2023, 31 pages.

* cited by examiner

200

```
I want you to act as an instruction analyzer.
Given an instruction, you should recognize its use case and the skills (or knowledge)
required for a large language model (LLM) to answer the question.
Generate the use case and skills required without any explanation.
List at most 3 skills, each skill should be transferable, so that LLM can leverage them to answer
similar questions.
Avoid using "skill", "knowledge" to describe a skill, and each skill should be concise (2~3 words).
Follow the examples below to analyze the given instruction.

#Example 1#
As a sports commentator, describe the winning play in the final seconds of a championship game.
Use case: creative writing
Skills: role-play, sports
...

<input instruction>
<output metadata>
```

FIG. 3B

```
I want you to act as an instruction writer.
Your objective is to write <number of instructions> instructions that must be reasonable
and must be understood and responded by humans.
The generated instructions should be diverse enough while following the constraints below:

Use case of the instructions: <use case>
Skills required to respond to the instructions: <skills>

Generate the instructions without answering in numbered bulletin points.

<output instructions>
```

FIG. 4B

I want you to act as a instruction judge with domain expertise.
Your job is to generate <number_of_rubrics> domain specific rubrics to assess the difficulty and complexity based on the use case of the instruction, and skills required to respond to it.
The generated rubrics should be clear, concise and unambiguous.
Based on the generated rubrics, generate corresponding action items to improve an instruction.

The use case of the instruction: <use case>.
The skills required to solve the instruction: <skills>.

Generate the domain-specific rubrics and actions without explanation in numbered bulletin points:

<output rubrics>
<output action items>

FIG. 5B

```
I want you to act as a instruction improver with domain expertise.
Your job is to make the given instruction more challenging following the given improving action
item, and the generated instruction should be reasonable and self-consistent.
Do not directly copy words or phrases in the action item.

Improving action item: <action item>
Input instruction: <input instruction>

Improved instruction: <output instruction>
```

FIG. 6B

MACHINE-LEARNED MODEL ALIGNMENT WITH SYNTHETIC DATA

PRIORITY CLAIM

This application is based upon and claims the right of priority to U.S. Provisional Application No. 63/554,545, filed on Feb. 16, 2024, the disclosure of which is hereby incorporated by reference herein in its entirety for all purposes.

FIELD

The present disclosure relates generally to machine learning processes and machine-learned devices and systems. More particularly, the present disclosure relates to sequence processing models and adaptations of such models for downstream applications.

BACKGROUND

Artificial intelligence systems increasingly include large foundational machine-learned models which have the capability to provide a wide range of new product experiences. As these large foundational models, also referred to as core models, become more prevalent, so too have adaptations of the systems by downstream users of the models. For instance, downstream users of a pre-trained model may specialize or otherwise modify a sequence processing model such as a large language model (LLM). Different approaches may be used to adapt models for different downstream uses. For example, one approach may be referred to as parameter-efficient fine-tuning in which a pre-trained model is adapted by changing a small subset of the model weights. Another approach may be referred to as regular fine-tuning in which all or a large number of the model weights are changed to suit a particular use case.

Recently, generative models such as LLMs have been used to generate synthetic training data in an effort to reduce the labor and time cost to collect and/or annotate data by humans. While synthetic training data may be useful, there remains a need for techniques that can generate high-quality synthetic training data that is tailored for different downstream computing tasks.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method that includes obtaining instruction metadata indicative of at least one use case and at least one skill associated with a particular computing task to be performed by a target machine-learned model, generating a metadata-conditioned synthetic instruction by prompting a generative model system including one or more machine-learned generative models with the instruction metadata as one or more constraints, generating a model response by prompting the generative model system with the metadata-conditioned synthetic instruction, and modifying a target sequence processing model based at least in part on a data pair including the metadata-conditioned synthetic instruction and the model response.

Another example aspect of the present disclosure is directed to a system that includes one or more processors and one or more computer-readable storage media that store instructions that, when executed by the one or more processors, cause the one or more processors to perform operations. The operations include obtaining instruction metadata indicative of at least one use case and at least one skill associated with a particular computing task to be performed by a target machine-learned model, generating a metadata-conditioned synthetic instruction by prompting a generative model system including one or more machine-learned generative models with the instruction metadata as one or more constraints, generating a model response by prompting the generative model system with the metadata-conditioned synthetic instruction, and modifying a target sequence processing model based at least in part on a data pair including the metadata-conditioned synthetic instruction and the model response.

Yet another example aspect of the present disclosure is directed to a computer-implemented method that includes obtaining a set of instruction metadata including at least one use case and at least one skill associated with a particular instruction-following computing task, generating at least one metadata-conditioned synthetic instruction by prompting a generative model system including one or more machine-learned generative models with the instruction metadata, generating at least one instruction-refinement action by prompting the generative model system with the instruction metadata, generating at least one refined metadata-conditioned synthetic instruction by prompting the generative model system with the at least one instruction-refinement action and the at least one metadata-conditioned synthetic instruction, generating at least one response by prompting the generative model system with the at least one refined metadata-conditioned synthetic instruction, and modifying a target machine-learned model based at least in part on a data pair including the at least one refined metadata-conditioned synthetic instruction and the at least one response.

Other example aspects of the present disclosure are directed to other systems, methods, apparatuses, tangible non-transitory computer-readable media, and devices for performing functions described herein. These and other features, aspects, and advantages of various implementations will become better understood with reference to the following description and appended claims. The accompanying drawings, which are incorporated in and constitute a part of this specification, illustrate implementations of the present disclosure and, together with the description, help explain the related principles.

BRIEF DESCRIPTION OF THE DRAWINGS

FIG. 3B depicts an example prompt template to encode a seed instruction into metadata including a user case and transferrable skills according to example embodiments of the present disclosure;

FIG. 4B depicts an example prompt template for a sequence processing model such as an LLM to process task-specific metadata to generate synthetic metadata-conditioned instructions;

FIG. 5B depicts an example prompt template for a sequence processing model such as an LLM to process task-specific metadata to generate actions and rubrics for instruction improvement;

FIG. 6B depicts an example prompt template for a sequence processing model to iteratively prompt a model to improve a base instruction according to example embodiments of the present disclosure;

DETAILED DESCRIPTION

Figure 1:
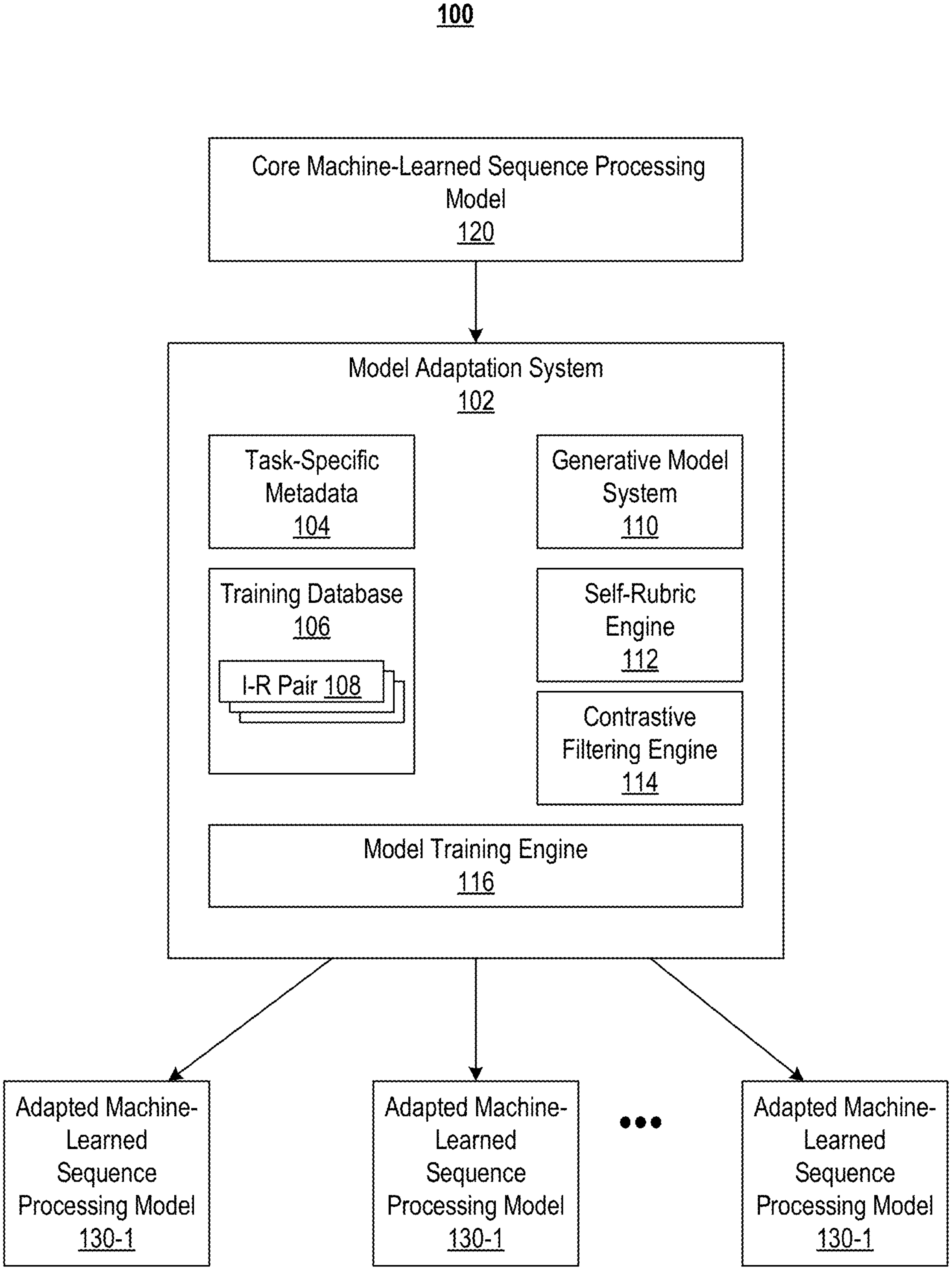
FIG. 1 is a block diagram depicting an example computing environment including a model adaptation system that is configured to generate adapted sequence processing models from a core sequence processing model using task-specific training data.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Generally, the present disclosure is directed to machine-learning systems and methods for adapting machine-learned models using high-quality synthetic data that is tailored to elicit improved instruction-following abilities for particular target instruction distributions and models. More particularly, a machine-learning system in accordance with example implementations can include a general framework for adaptively generating high-quality-synthetic data for aligning machine-learned models with different downstream instructions and models. By way of example, metadata associated with a particular downstream computing task can be provided to a generative model system including one or more generative models (e.g., a large language model (LLM)). The generative model system can generate a set of metadata-conditioned synthetic instructions tailored for the particular downstream computing task based on the task-specific metadata. The synthetic instructions can be provided to the generative model system to generate a set of synthetic responses. The instruction/response pairs can be used as training data to align a target machine-learned model such as a target LLM with the particular downstream computing task. In example embodiments, self-rubrics and/or contrastive filtering can be used to tailor data-efficient samples.

Machine-learned models such as large language models (LLMs) and other sequence processing models exhibit remarkable capabilities across a wide array of sequence processing tasks such as natural language processing (NLP) tasks. For example, LLMs can be trained for improved instruction-following through various methods, including fine-tuning on human annotated data or extracted knowledge from stronger LLMs. Recent progress in this area highlights the critical role of high-quality data in enhancing LLMs' instruction-following capabilities. Acquiring such data, however, can be cost-prohibitive and difficult to scale. Alternative solutions to human annotation for creating training data often focus on generating instruction-response pairs for LLM alignment by prompting models with example data or prompts and iteratively refining the results. These methods may be effective at generating diverse and complex instructions for LLM alignment broadly, but do not address real-world applications which often prioritize tailoring the LLM to specific downstream tasks such as individual enterprise applications or personal assistant agents which often involve different instruction distributions.

In accordance with example embodiments of the present disclosure, a machine-learning system is configured to generate tailored synthetic data to align machine-learned models such as LLMs and other sequence processing models for different instruction-following tasks. The system can be configured to align the LLMs for different downstream tasks that may involve specific instruction distributions. The system can include a data synthesis framework that can generate tailored synthetic data to align sequence processing models for specific downstream tasks. In accordance with example implementations, a generative model system including one or more generative models (e.g., LLMs) can be leveraged as a codec to both encode target task data into instruction metadata and to decode the instruction metadata into tailored synthetic instructions. The metadata can serve as a word-level abstraction of the input instruction distribution, including the use case and skills for effective instruction following. In some examples, the metadata can be automatically generated by encoding seed instructions. In other examples, the metadata can be directly provided by a user familiar with the downstream task.

The instruction metadata can be decoded using the generative model system to generate task-specific instructions tailored to the particular downstream computing task. According to an example implementation, the generative model system can be prompted with the metadata as one or more constraints. In response to the prompt, the generative model system can generate one or more initial task-specific synthetic instructions conditioned on the metadata. These metadata-conditioned synthetic instructions can be provided to the generative model system to generate a response to the instruction. The instruction-response pair can be used as training data or other modification data to adapt a target sequence processing model (e.g., LLM) for the specific downstream task.

The generated instruction-response pairs can be used to generate different adaptations of a core sequence processing model for different downstream applications. The model adaptation system can use different adaptation techniques to generate adaptations of the core model. Some applications may use parameter-efficient fine-tuning such as low-rank adaptation (LoRA) techniques, parameter-efficient fine-tuning (PEFT) techniques, prompt-tuning or custom adapters. Other applications may use regular fine-tuning by continuing a standard training process using custom data or by leveraging additional signals (e.g., human feedback) for reinforcement learning. In accordance with example embodiments, the model adaptation system can generate instruction-response pairs for different types of downstream adaptations.

By way of example, a target machine-learned model can be generated by adaptive training which can be the same or different for different downstream applications. For example, an adapter can be generated by fine-tuning a core model using instruction fine-tuning, human-feedback-fine-tuning via reinforcement learning or direct preference optimization. Other examples of adaptive training can include prompt-tuning of the core model or neural adapters that can include one or more layers. Additionally, the adapter can perform quantization or other inference runtime optimizations. Embodiments in accordance with the present disclosure can be used with any type of adaptive training and/or adapter.

The adapted models can adapt the weights or other parameters of the core model using downstream datasets in some examples. For example, the downstream datasets can include summarization data, composition data, question/answer data, dialogue data, or any other data that is used to fine-tune the model for a particular downstream computing task. As a result of fine-tuning, the downstream computing task can utilize entirely new substitute parameter weights for the core model or a subset of substitute parameter weights for the core model. In some examples, additional or new parameter weights can be added by the adapter. In some examples, the outputs of the adaptive training for each target model can result in an adapter that includes the substitute/additional parameter weights, layers, or other data used to adapt the core model to a specific use case for a downstream application.

In accordance with example embodiments, a self-rubric engine can be used to refine initial synthetic instructions, for example, to elevate instruction quality. The self-rubric engine can provide metadata for a particular downstream task to the generative model system as part of a prompt to generate rubrics and actions for assessing instruction complexity. The generative model system can generate metadata-specific rubrics for assessing instruction complexity. Informed by the rubrics, the generative model system can generate a corresponding set of actions to enhance instruction complexity. The generated actions can be domain-specific and unambiguous when compared with generic rules crafted by humans. An initial instruction can be provided to the generative model system as part of a prompt instructing the model to generate a refined instruction based on one or more actions such as an instruction-refinement action. The refined instructions can be better tailored toward the target distribution captured by the metadata. Consider an example use case of "business plan development" and skills of "market research and planning." A traditional approach may utilize generic rules such as "add reasoning steps," which can be vague and inappropriate. By leveraging self-rubrics, implementations in accordance with embodiments of the present disclosure can generate task-specific actions such as "add SWOT (strengths, weaknesses, opportunities, and threats) analysis" and "include comparison with market competitors" to refine the instruction.

In accordance with example embodiments, a contrastive filtering engine can be used to select the most impactful instructions for aligning a target machine-learned model. The contrastive filtering engine can provide a synthetic instruction to the generative model system to generate a response. The contrastive filtering engine can also provide the synthetic instruction to the target machine-learned model to generate a response. The contrastive filtering engine can then compare the responses to evaluate response quality, for example by defining a quality gap between the responses.

A quality gap metric can be generated that reflects the benefit of the target model from the response from the generative model system for each instruction. In an example embodiment, the contrastive filtering engine can provide the response from each model to the generative model system with a prompt to generate a quality score for each response.

If the quality gap meets one or more criteria, such as by exceeding a threshold, it can be indicative of the response from the generative model system being stronger than the response from the target model. In such a case, the instruction-response pair can be added to a training database for adapting the target model. If the quality gap does not meet the one or more criteria, such as by being less than or equal to the threshold, it can indicate that the quality of responses from both models is similar so learning from the synthetic instruction is unlikely to lead to significant gains. Accordingly, the instruction can be provided to the self-rubric engine for another iteration to further improve the instruction quality. In some examples, if the quality of the response from the target LLM exceeds the quality of the response from the generative model system by a predefined amount, the instruction-response pair can be added to the training database as an implicit regularization to keep the target model's behavior aligned to certain instructions.

The generative model system can include one or more generative models such as large language models or other sequence processing models. In one example implementation, a single sequence processing model (e.g., an LLM) can be used to generate instruction metadata from seed instructions, to generate rubrics, actions, and metadata-conditioned synthetic instructions from the instruction metadata, to generate refined synthetic instructions, and to generate responses to synthetic instructions. In other implementations, different sequence processing models can be used for one or more of the various generative steps.

Accordingly, a model adaptation system is described including a framework for generating high-quality synthetic instruction-response pairs to adaptively align large language models (LLMs) for various downstream tasks without human annotation. The model adaptation system addresses the challenge of current LLM alignment methods which rely on expensive human annotation or heuristics for data quality that are suboptimal for different task distributions and target LLMs. The model adaptation system leverages an LLM to first encode seed instructions (or user-provided task descriptions) into concise instruction metadata representing the use case and transferable skills required. This metadata serves as a compact representation of the instruction distribution. The metadata is then decoded by the strong LLM to generate initial synthetic instructions. To enhance these instructions, the model adaptation system utilizes self-rubrics, where the LLM self-generates rubrics and actions to iteratively increase instruction complexity in a task-specific manner. Finally, contrastive filtering dynamically assesses the quality of generated instruction-response pairs by comparing the responses of the system LLM and the target LLM using an LLM-based scoring function. This allows for the selection of the most beneficial data for fine-tuning the target LLM, prioritizing instructions where the target LLM's performance lags behind the system LLM. The resulting high-quality synthetic data is then used to fine-tune the target LLM, improving its instruction-following capabilities for the specific task defined by the instruction metadata. The system is adaptable to scenarios with or without seed instructions, offering a flexible and efficient approach to LLM alignment.

Systems and methods in accordance with example embodiments of the present disclosure provide a number of technical effects and benefits. In particular, the systems and methods can include a computing system that is configured to generate metadata-conditioned synthetic data that can be used to align sequence processing models for specific downstream computing tasks. Specifically, instruction metadata for a particular computing task can be used to generate synthetic data that is tailored for a particular computing task. A generative model such as large language model can generate task-specific instructions in response to a prompt including the instruction metadata. The metadata can serve as a word-level abstraction of the input instruction distribution, including the use case and skills for effective instruction-following for the target computing task. The model can then be prompted with the task-specific instructions to generate synthetic responses. The instruction-response pairs can be used to tailor a target sequence processing model such as another LLM for the particular computing task.

By prompting a model to generate synthetic instructions based on task-specific instruction metadata, systems and methods in accordance with example implementations can effectively tailor a target model for a particular downstream task. Such an approach can overcome the shortcomings of approaches that attempt to use diverse and complex datasets. For example, a diverse dataset for one task might not effectively cover the instruction distribution for another dataset. Furthermore, the definition of "complex" instructions can be subjective and vary across tasks. Further, an LLM might excel at some seemingly complex instructions while struggling with others that appear simple according to human-crafted criteria. These limitations can be overcome using a unified data synthesis framework that can generate tailored data to align models on specific downstream tasks. According to example implementations, power and computing resources such as processing capacity and power consumption can be reduced relative to previous approaches that utilize diverse and/or complex datasets. Such approaches can lead to increased power and computing resource consumptions due to retraining and other attempts to optimize the target models for multiple diverse tasks.

In example implementations, the target sequence processing model can include a large language model (LLM). Much of the following disclosure refers to large language models as specific examples of sequence processing models but it will be appreciated that the disclosure is equally applicable to any type of sequence processing model. For example, the disclosed technology can be used with large image models, multimodal models, and other types of foundational models. For instance, the core sequence processing models can operate in domains other than the text domain, such as image domains, audio domains, biochemical domains, etc. For instance, a sequence processing model may be used to process sequential inputs for robotic controls and other tasks. Similarly, the core model and/or the downstream applications can be configured to perform any number of tasks. For instance, if the inputs to the core model and/or a downstream application are images or features that have been extracted from images, the output generated by the core model and/or the downstream application for a given image can be scores for each of a set of object categories, with each score representing an estimated likelihood that the image contains an image of an object belonging to the category. As another example, if the inputs to the core model and/or a downstream application are sensor data, the outputs can be robotic control signals.

As another example, if the input to the core model and/or a downstream application is a sequence representing a spoken utterance, the output generated can be a score for each of a set of pieces of text, each score representing an estimated likelihood that the piece of text is the correct transcript for the utterance.

As another example, if the input to the core model and/or a downstream application is a sequence of physiological measurements, the output generated may be a score for each of a set of possible diagnoses for the condition of a user, with the score representing an estimated likelihood that the diagnosis is accurate.

As another example, if the input to the core model and/or a downstream application is a sequence of text from a received communication, the output generated may be a score for each of a set of possible responses to the received communication, with the score representing an estimated likelihood that the response matches a user's intent.

As another example, if the input to the core model and/or a downstream application is indicative of a particular function to be performed by an apparatus (such as a robot), the output generated may be a score for each of a set of possible control signals for controlling the apparatus, with the score representing an estimated likelihood that the control signals match the particular function to be performed.

As another example, if the input to the core model and/or a downstream application includes natural language indicative of a computer implemented operation, the output generated may be a score for each of a set of possible computer readable code segments, with the score representing an estimated likelihood that the computer readable code segments match the computer implemented operation.

As another example, if the input to the core model and/or a downstream application is a sequence of text in one language, the output generated may be a score for each of a set of pieces of text in another language, with each score representing an estimated likelihood that the piece of text in the other language is a proper translation of the input text into the other language.

Although a number of examples of tasks which may be performed by the core model and/or a downstream application are provided here, it will be understood that this is not exhaustive, and that the core model and/or the downstream applications can be configured to perform any suitable task.

With reference now to the Figures, example embodiments of the present disclosure will be discussed in further detail.

Example Model Arrangements

FIG. 1 is a block diagram depicting an example computing environment 100 including a model adaptation system 102 that is configured to generate adapted machine-learned sequence processing models 130-1, 130-2, . . . , and **130-*n* from a core machine-learned sequence processing model 120 using task-specific training data. The core sequence processing model 120 can be referred to as a target sequence processing model. Computing environment 100 can include a host sequence processing system that includes model adaptation system 102. The host sequence processing system can implement a first version of the core sequence processing model 120** which can be accessed by downstream applications, associated with client computing devices for example.

In some examples, model adaptation system 102 can be implemented by a host sequence processing system which can be accessed by one or more client computing systems or other remote computing systems. For instance, computing environment 100 may be implemented as a client server computing environment, including one or more client computing devices implementing downstream applications and one or more server computing systems implementing model adaptation system 102. A server computing system can include one or more processor(s) and memory implementing model adaptation system 102.

The computing systems implementing the model adaptation system and remote computing systems can be connected by and communicate through one or more networks (not shown). Any number of client computing devices and/or server computing devices can be included in the client-server environment and communicate over a network. The network can be any type of communications network, such as a local area network (e.g., intranet), wide area network (e.g., Internet), or some combination thereof. In general, communication between the computing devices can be carried via a network interface using any type of wired and/or wireless connection, using a variety of communication protocols (e.g., TCP/IP, HTTP, RTP, RTCP, etc.), encodings or formats (e.g., HTML, XML, etc.), and/or protection schemes (e.g., VPN, secure HTTP, SSL, etc.).

In some example embodiments, a client computing device implementing a downstream application can be any suitable device, including, but not limited to, a smartphone, a tablet, a laptop, a desktop computer, or any other computer device that is configured such that it can allow a user to access remote computing devices over a network. The client computing devices can include one or more processor(s), memory, and a display as described in more detail hereinafter. The client computing devices can execute one or more client applications such as a web browser, email application, chat application, video conferencing application, word processing application or the like.

It will be appreciated that the term "system" can refer to specialized hardware, computer logic that executes on a more general processor, or some combination thereof. Thus, a system can be implemented in hardware, application specific circuits, firmware, and/or software controlling a general-purpose processor. In one embodiment, the systems can be implemented as program code files stored on a storage device, loaded into memory and executed by a processor or can be provided from computer program products, for example computer executable instructions, that are stored in a tangible computer-readable storage medium such as RAM, hard disk, or optical or magnetic media.

Model adaptation system 102 can generate adapted machine-learned models 130-1, 130-2, and **130-*n* prior to deployment for various downstream tasks. Any number of adapted machine-learned models can be generated from a target or core machine-learned sequence processing model. A core machine-learned sequence processing model 120, also referred to as a target sequence processing model 120, can include a generalized machine-learned model that is trained and/or pretrained for one or more tasks. Often, a core machine-learned model such as a sequence processing model (e.g., a large language model) is trained and/or pretrained for general functionality so that it can be used for many different downstream applications. In example embodiments, core sequence processing model 120 can be trained and/or pretrained by model training engine 116**. The training or pretraining process can include defining a model architecture (e.g., encoder-decoder, decoder-only, encoder-only, etc.), defining a pre-training procedure (e.g., defining a loss such as masked-language model, causal-language model, mixture of denoisers, etc.), defining a model size (e.g., 1 billion (B) parameters, 8B parameters, 24B parameters, etc.), and defining the pre-training datasets. As an example, consider a core large language model which may undergo significant training on multiple processors over a long period of time using a large quantity of training data. Such a model may include 1 billion (B), 8B, 16B, 32B, or more parameters. After training, the core-sequence processing model can be deployed by a host sequence processing system (e.g., at a server computing system as part of a cloud computing service) for access and use by downstream applications.

Model adaptation system 102 can update or otherwise modify core sequence processing model 120 by training with additional training data, for example. Model training engine 116 can update or retrain the core sequence processing model by modifying or substituting all or a subset of the weights of the core model, adding additional parameter weights, adding layers to the core model, or any other modification to the parameters defined for the core sequence processing model. The retraining can result in an adapted machine-learned model 130-1, 130-2, . . . 130-*n*, such as a second version of the core sequence processing model.

Model adaptation system 102 includes a generative machine-learned generative model system, also referred to as generative model system 110, a self-rubric engine 112, a contrastive filtering engine 114, and a model training engine 116. Model training engine 116 can train, retrain, fine-tune or otherwise update core sequence processing model 120 to generate an adapted machine-learned model 130. Model training engine 116 can train core sequence processing model 120 using instruction-response pairs 108 that are stored in training database 106 or other storage device. Training the core sequence processing model can include modifying the core machine-learned sequence processing model, such as modifying parameters including weights, layers, etc. of the machine-learned model. Model adaptation system 102 can generate instruction-response pairs 108 from task-specific metadata 104 for a particular downstream computing task. Task-specific metadata 104 can include instruction metadata for a particular downstream task. The instruction metadata can be derived from a set of seed instructions from an underlying distribution in some examples. The seed instruction can be collected from usage traffic in an example embodiment. In other examples, the task-specific metadata can be provided in advance, such as from a domain expert.

Model adaptation system 102 includes a general framework for adaptively generating synthetic training data including task specific training data for aligning machine-learned models (e.g., core sequence processing model 120) with different downstream instruction distributions and target machine-learned models. Model adaptation system 102 can extract task-specific metadata 104, also referred to as instruction metadata, which can include concise keywords to capture instruction distributions from seed instructions. In other examples, task-specific metadata 104 can include human generated task-specific metadata. Using the task-specific metadata, model adaptation system 102 can generate instruction-response pairs 108. In an example embodiment, model adaptation system 102 can pass the task-specific metadata to one or more machine-learned models of generative model system 110 to generate synthetic instruction-response pairs based on the metadata. Self-rubric engine 112 can generate rubrics and actions to improve the data quality adaptively based on the task-specific metadata. Contrastive filtering engine 114 is complementary to self-rubric engine 112 and can operate to further identify the most useful data to improve the core sequence processing model 120.

Figure 2:
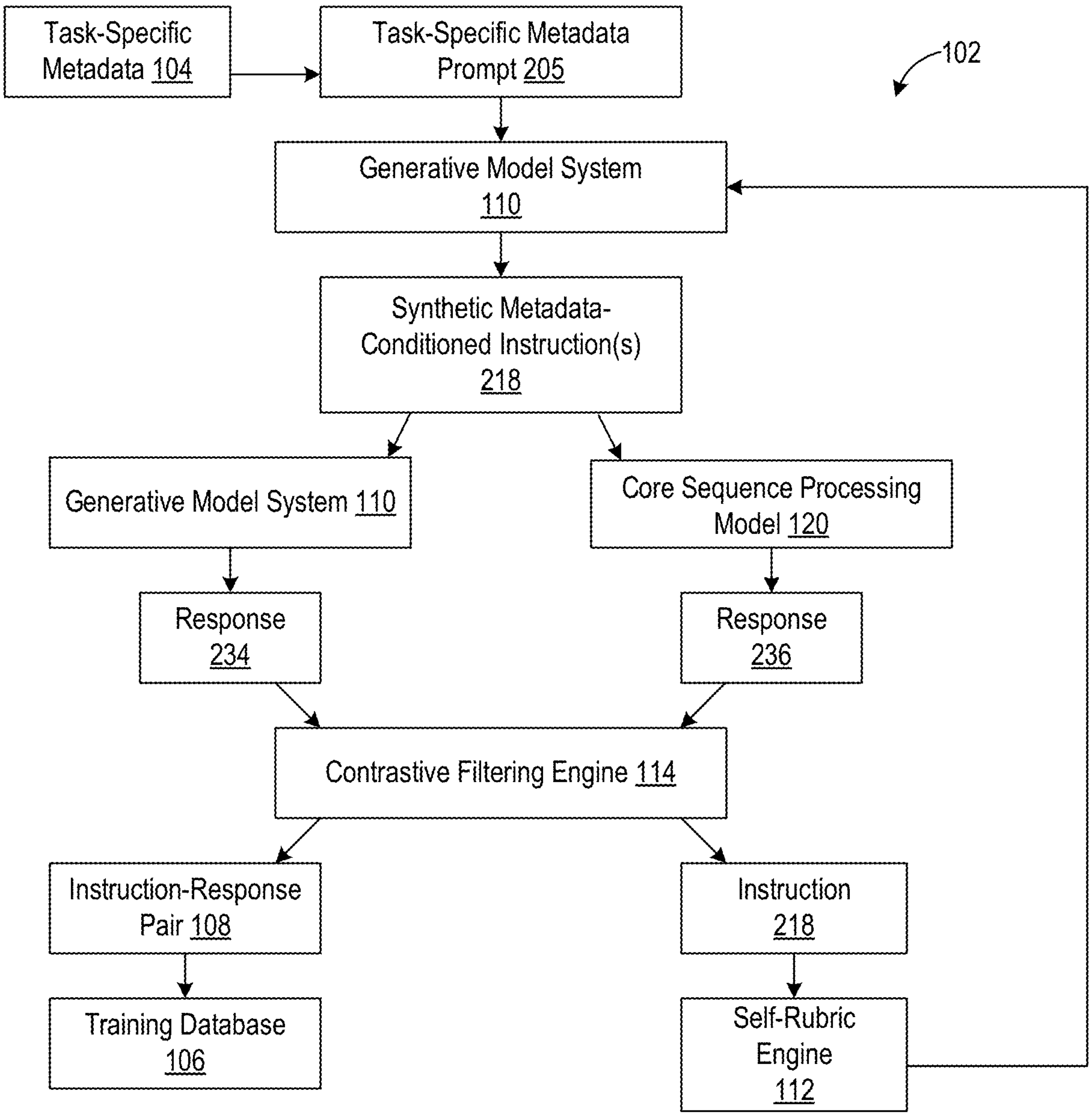
FIG. 2 is a block diagram depicting an example computing environment and a data flow for generating synthetic instruction training data using a model adaptation system according to example embodiments of the present disclosure.

FIG. 2 is a block diagram depicting an example computing environment 200 and a data flow for generating synthetic instruction training data using a model adaptation system 102 according to example embodiments of the present disclosure. Model adaptation system 102 is configured to generate one or more instruction-response pairs 108 for training database 106 based on task-specific metadata 104. Model adaptation system 102 can implement an instruction encoder that is configured to decompose seed instructions into metadata as a proxy of an underlying task distribution. Conditioned on the extracted instruction metadata, an instruction decoder can generate instructions and further improve them adaptively through the self-rubric engine 112. Contrastive filtering engine 114 can select the most useful instruction-response pairs for aligning the core sequence processing model 120 with a downstream computing task.

Model adaptation system 102 can access task-specific metadata 104 and/or generate task-specific metadata 104 from one or more seed instructions. For example, the system can directly start from a given set of instruction metadata $\mathcal{M}$ in one example. In another example, the system can start from a given set of n seed instructions $$D_S = \{I_i\}_{i=1}^n,$$

where each instruction is from an underlying distribution $P_I$. The target of model adaptation system 102 can be to generate a set of high-quality instruction-response pairs $D_g =$ $$\{(I'_j, R'_j)\}_{j=1}^m,$$

with the access of a strong LLM ($f_s$), and use of $D_g$ to fine-tune the target LLM ($f_t$). The performance of the fine-tuned LLM ($f_t$) can be evaluated on test instructions from the same distribution $P_I$.

The task-specific metadata can include use cases and skills for a particular downstream computing task. Model adaptation system 102 can include an instruction encoder that encodes seed instructions $$D_S = \{I_i\}_{i=1}^n$$

into task-specific metadata ($\mathcal{M}$) (also referred to as instruction metadata). The instruction metadata can include compact representations that capture the underlying task distribution. The metadata can be defined as use cases and transferable skills. The use cases can describe the fine-grained task of the instruction, such as question answering or creative writing. The transferable skills can include the skills and knowledge the sequence processing model needs to successfully respond to the given instruction (e.g., math or history). Generally, an instruction can correspond to a single use case, with possible multiple skills.

Given the task-specific metadata 104 (either extracted or accessed), model adaptation system 102 can follow a generate and self-improve paradigm using an instruction decoder. Each use case and skills pair in metadata 104 is leveraged as a constraint to generate a task-specific metadata prompt 205. The task-specific metadata prompt 205 can then be provided to a large language model or other sequence processing model of generative model system 110 to generate one or more synthetic metadata-conditioned instructions 218.

Optionally, the large language model can generate one or more rubrics/actions for one or more instructions 218. Instructions generated directly by conditioning on metadata can often be simple and concise. More complex and difficult instructions can often elicit better alignment performance. Accordingly, the large language model can be prompted with the use case and skills to generate action items to improve the instructions in an instance-wise fashion. After obtaining the action items, self-rubric engine 112 can iteratively generate and provide prompts to the large language model of generative model system 110 to improve the base instruction 218.

Once the base instruction has been iteratively improved (optional), the model adaptation system provides the base instruction 218 or improved base instruction to a sequence processing model of generative model system 110 and to the core sequence processing model 120. The generative model system 110 generates a response 234 and the target sequence processing model generates a response 236 to the improved instruction. Response 234 and response 236 are then provided to contrastive filtering engine 114.

The use of self-rubrics can improve instructions iteratively in terms of difficulty and complexity. In accordance with example embodiments, contrastive filtering can be used to consider the ability of the core sequence processing model 120 when assessing instruction quality. For example, the core sequence processing model may be able to respond to some complex instructions well, while failing to generate satisfactory answers to some relatively easier instructions. Model Adaptation system 102 provides contrastive filtering to provide the target sequence processing model with instructions to which it currently cannot respond well in order to effectively reduce blind spots in the model.

Contrastive filtering engine 114 can be used to select the instructions to which the target sequence processing model 120 currently struggles to respond. Contrastive filtering engine 114 receives or otherwise accesses response 234 from generative model system 110 and response 236 from the target sequence processing model 120. In accordance with an example embodiment, contrastive filtering engine 114 can determine a quality gap between response 236 and response 234. The quality gap G can indicate to what degree the target sequence processing model 120 can benefit from the instruction generated by the sequence processing model of the generative model system 110.

Contrastive filtering engine 114 can compare the quality gap G to a predetermined threshold quality gap. If the quality gap is above the predetermined threshold, this indicates that the strong LLM has a much better response than the target sequence processing model. In this instance, contrastive filtering engine 114 can add the instruction-response pair 108 to training database 106. If the quality gap is equal to or below the predetermined threshold, this indicates that the strong LLM does not have a better or much better response, and thus, that the training with this specific instruction will not lead to much gain. In this instance, the instruction-response pair is not added to the training database 106. Instead, the model Adaptation system provides the instruction 218 to self-rubric engine 112 for further improvement. In some examples, the system can determine if the quality gap is less than the negative of the threshold. If so, this indicates that the target sequence processing model generated a much better response than the strong LLM of the generative model system. In this instance, the instruction response pair 108 can be added to the training database 106 so that the instruction-response pair serves as an implicit regularization to keep the target sequence processing model's desirable behavior for certain instructions.

Figure 3A:
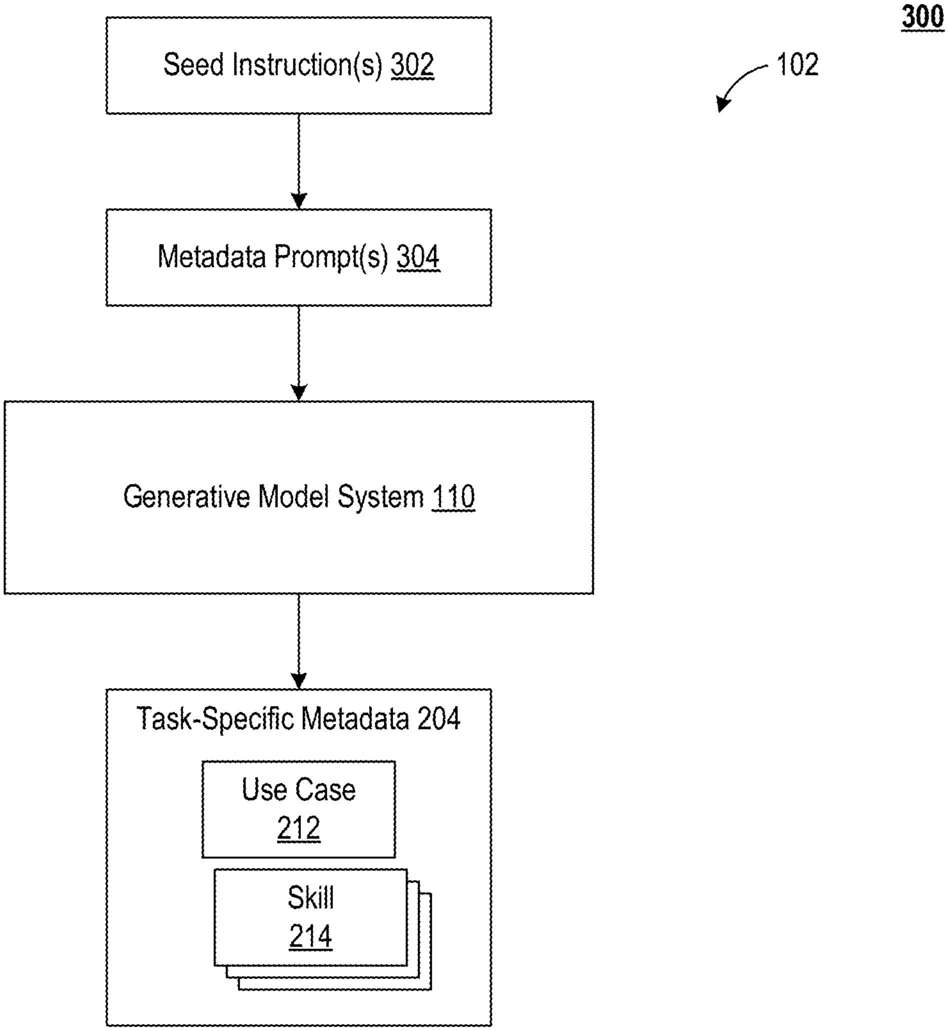
FIG. 3A is a block diagram depicting an example computing environment including a model adaptation system configured to generate task-specific metadata based on seed instructions associated with particular downstream computing tasks according to example embodiments of the present disclosure.

FIG. 3A is a block diagram depicting an example computing environment 300 including a model adaptation system 102 that is configured to generate task-specific metadata 204 based on seed instructions 302 associated with particular downstream computing tasks according to example embodiments of the present disclosure. Each seed instruction can be formulated into one or more metadata prompts 304 that are provided to one or more sequence processing models (e.g., an LLM) of the generative model system. The generative model system can process the metadata prompts to generate task-specific metadata 204 that includes at least one use case 212 and at least one skill 214 for the instruction.

The model adaptation system 102 can start from a set of n seed instructions 302. The seed instructions can be defined as $$D_S = \{I_i\}_{i=1}^n,$$

where each instruction is from an underlying distribution $P_I$. The instructions can be collected from usage traffic for users of a sequence processing model. A goal or target of the system can be defined to generate a set of high-quality instruction-response pairs $$D_g = \{(I'_j, R'_j)\}_{j=1}^m,$$

with the access of a strong sequence processing model (e.g., LLM) $f_s$, and use of $D_g$ to fine-tune the target sequence processing model (e.g., LLM) $f_t$ on test instructions from the same distribution $P_I$.

Model Adaptation system 102 can encode seed instructions $$D_S = \{I_i\}_{i=1}^n$$

instruction metadata $\mathcal{M}$ as compact representations that capture the underlying task distribution. For each instruction $I_i$, the model adaptation system can extract the corresponding use case $u_i$ and a set of transferrable skills $s_i$ forming a set of metadata defined as $\mathcal{M}$. For different instructions $u_i$'s and $s_i$'s may be similar or partially overlap, which implicitly reflects the proportion of use cases and skills contained within the instruction distribution.

Optionally, the model adaptation system can further enrich the metadata by augmenting it by mix-and-matching use cases and skills from different instructions. For example, the system can randomly sample one use case from $$\{u_i\}_{i=1}^n$$

and pair it with one or more unique skills $s_i$ sampled without replacement from $$\bigcup_{i=1}^n s_i.$$

In an example implementation, the model adaptation system does not explicitly constrain the use cases and skills to some predefined sets for generalizability to different tasks. In other examples, the system can provide such constraints with prior knowledge, or even directly write metadata without any seed instructions.

FIG. 3B depicts an example prompt template to encode a seed instruction into metadata including a use case and transferrable skills.

Figure 4A:
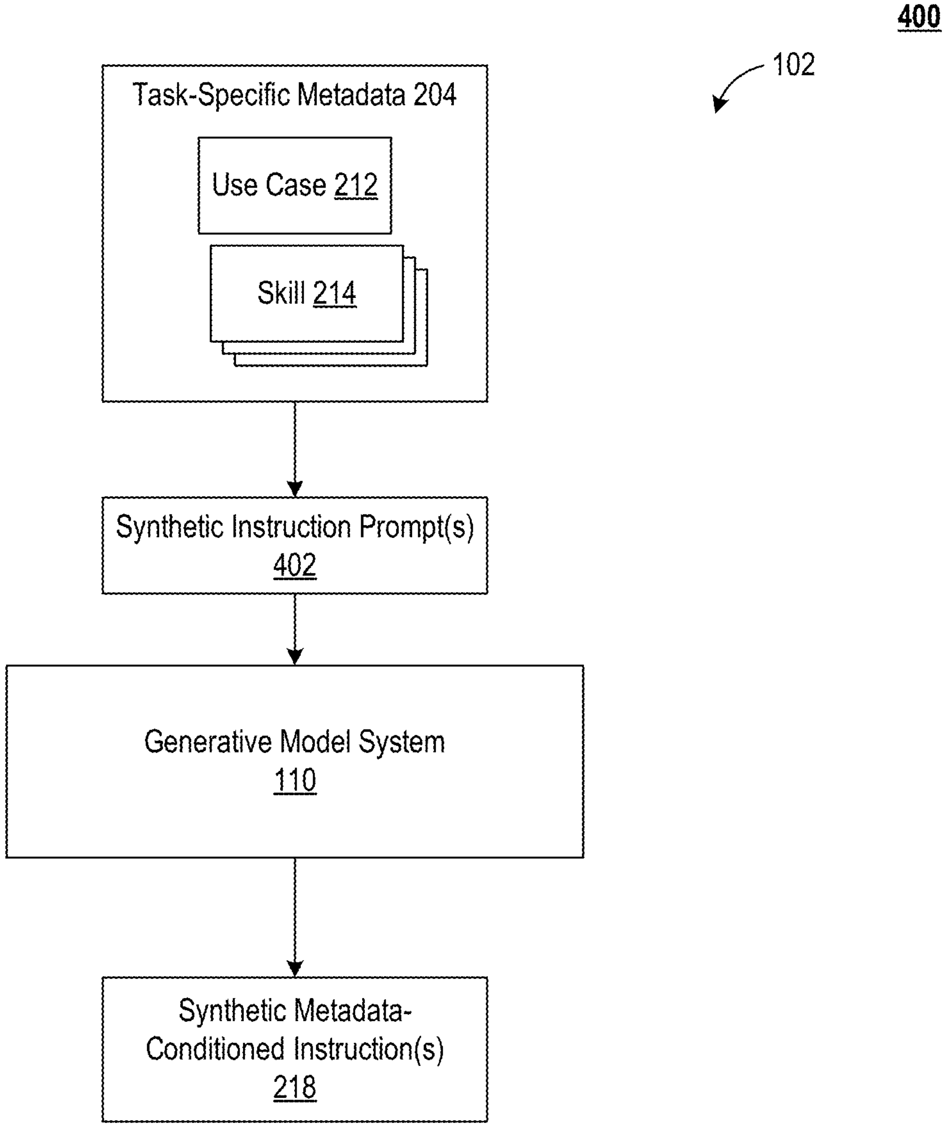
FIG. 4A is a block diagram depicting an example computing environment including a model adaptation system that is configured to generate one or more synthetic metadata conditioned instructions for training data based on task-specific metadata according to example embodiments of the present disclosure.

FIG. 4A is a block diagram depicting an example computing environment 400 including a model adaptation system 102 that is configured to generate one or more synthetic metadata conditioned instructions 218 for training data based on task-specific metadata 204 according to example embodiments of the present disclosure. Task-specific metadata 204 including at least one use case 212 and skill 214 can be formulated into one or more synthetic instruction prompts 402 that are provided to one or more sequence processing models (e.g., LLM) of the generative model system 110. The generative model system can process the synthetic instruction prompts to generate synthetic metadata-conditioned instructions 218. The model adaptation system can leverage each use case and skills pair in $\mathcal{M}$ as constraints to prompt the sequence processing model (e.g., the strong LLM $f_s$) to generate multiple instructions.

FIG. 4B depicts an example prompt template for a sequence processing model such as an LLM to process task-specific metadata 204 to generate synthetic metadata-conditioned instructions 218.

Figure 5A:
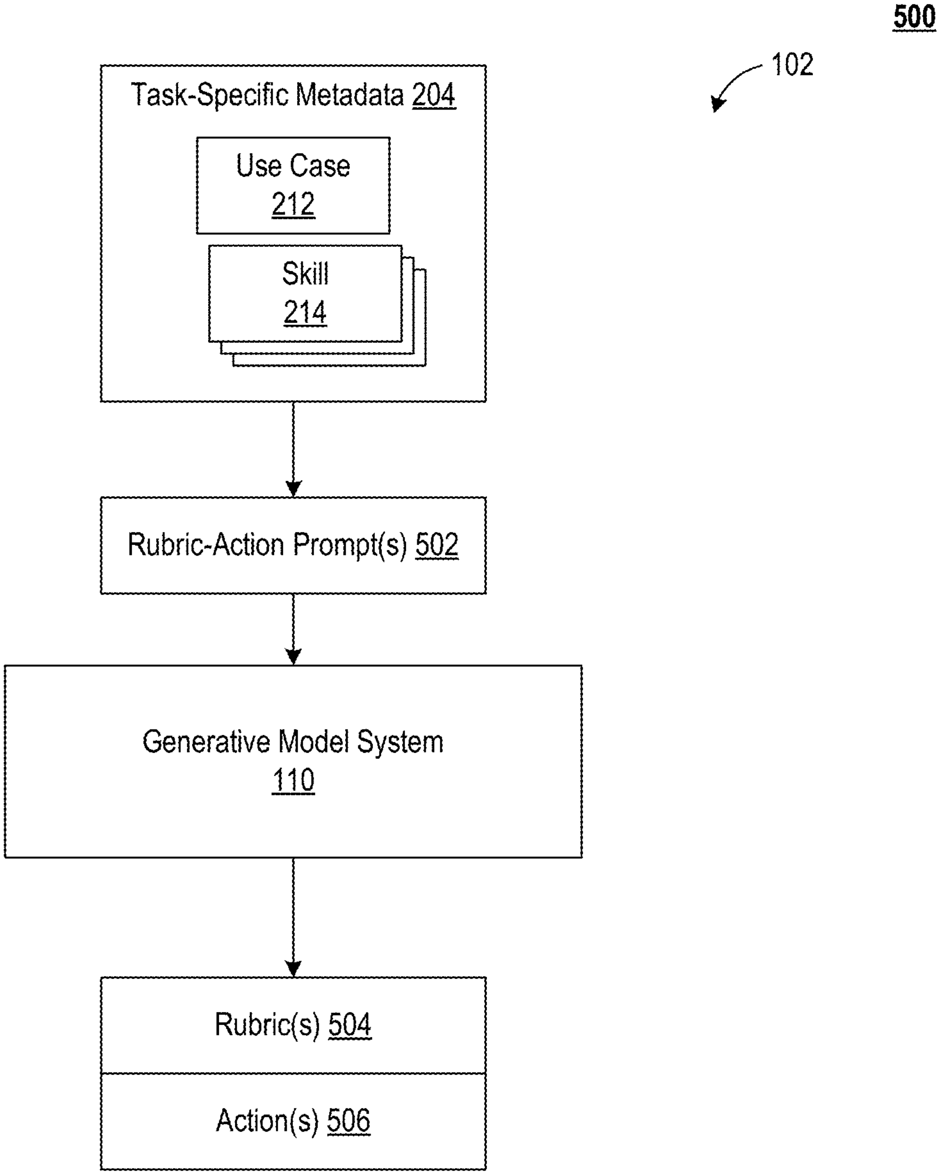
FIG. 5A is a block diagram depicting an example computing environment including a model adaptation system that is configured to generate rubrics and/or actions based on task-specific metadata according to example embodiments of the present disclosure.

FIG. 5A is a block diagram depicting an example computing environment 500 including a model adaptation system 102 configured to generate rubrics and/or actions based on task-specific metadata 204 according to example embodiments of the present disclosure. The instructions generated directly by conditioning on metadata can be simple and concise. More complex and difficult instructions can often elicit better alignment performance. Accordingly, the model adaptation system can prompt a sequence processing model (e.g., LLM) of the generative model system with the use case and skill to generate one or more rubrics and/or action items associated with the base generated instruction.

A common practice is to ask human experts to write general guidance to complicate the instructions, such as add reasoning steps or constraints. However, human-written guidance cannot serve as a one-size fits-all solution for different instructions. For example, consider two different instructions about solving calculus problems and writing news articles, respectively. Making these two instructions more difficult requires very different guidance.

Task-specific metadata 204 including at least one use case 212 and skill 214 can be formulated into one or more rubric-action prompts 502 that are provided to one or more sequence processing models (e.g., LLM) of the generative model system 110. The generative model system can process the rubric-action prompts to generate synthetic rubrics 504 and/or actions 506. Self-rubrics can leverage a strong LLM of the generative model system to decide the most proper way to improve different instructions based on the metadata that is extracted. The model adaptation system can formulate prompts asking the LLM to generate action items in an instance-wise fashion, given its use case and transferable skills. To make the internal reasoning process smoother for the LLM, the LLM can be guided to first generate a set of metadata specific rubrics to assess the difficulty and complexity level of instructions, and then generate corresponding action items to complicate instructions based on such rubrics. For metadata ($u_i$; $s_i$), the corresponding set of generated action items can be set forth as ai.

FIG. 5B depicts an example prompt template for a sequence processing model such as an LLM to process task-specific metadata 204 to generate actions and rubrics for instruction improvement.

Figure 6A:
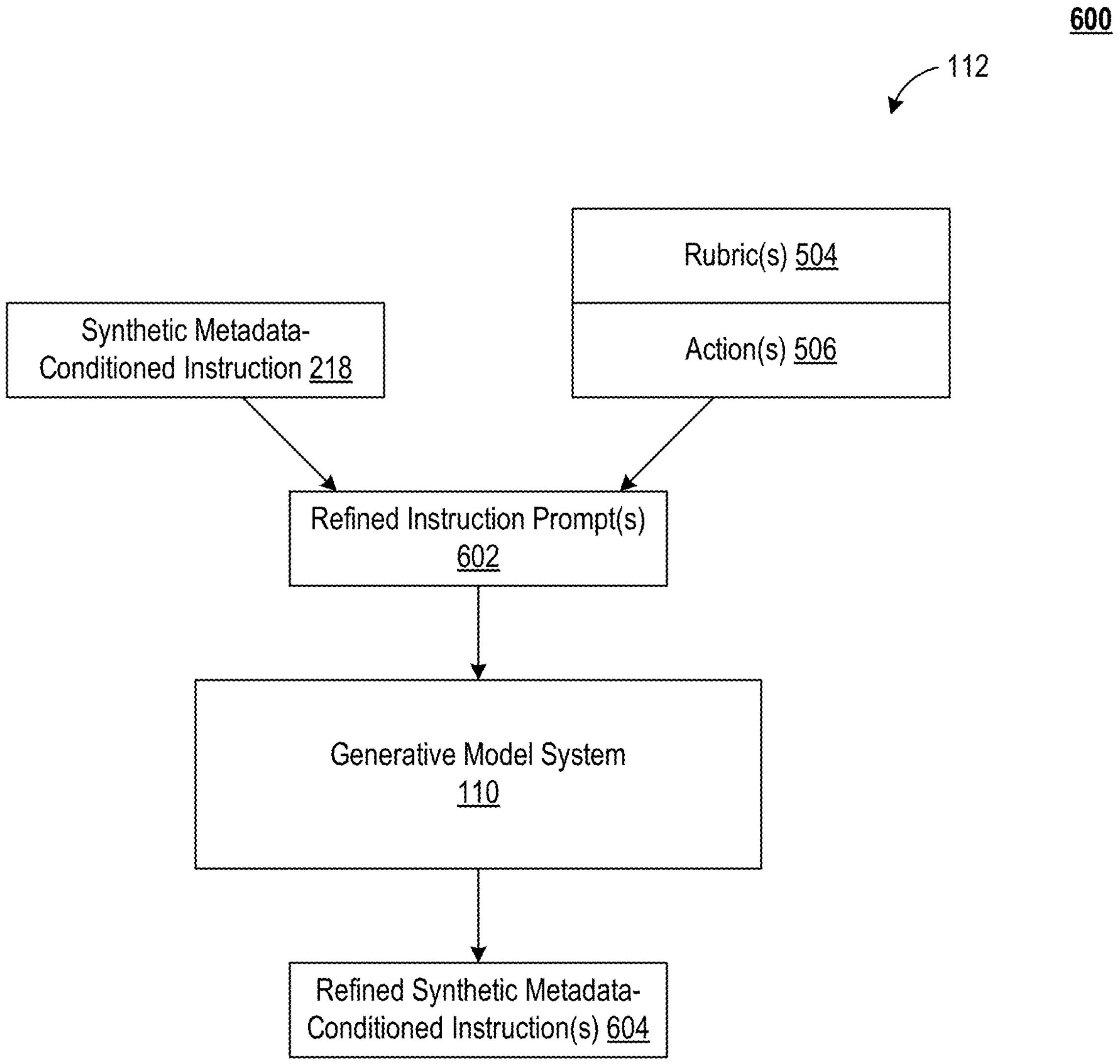
FIG. 6A is a block diagram depicting an example computing environment including a self-rubric engine configured to generate a refined synthetic metadata-conditioned instruction from a synthetic metadata-conditioned instruction and rubrics and/or actions according to example embodiments of the present disclosure.

FIG. 6A is a block diagram depicting an example computing environment 600 including a self-rubric engine 112 configured to generate a refined synthetic metadata-conditioned instruction 604 from a synthetic metadata-conditioned instruction 218 and rubrics 504 and/or actions 506 according to example embodiments of the present disclosure. After obtaining the action items $$\{a_i\}_{i=1}^{n},$$

the rubric engine can iteratively generate refined instruction prompts 602 and prompt the LLM to improve the base instruction according to a prompt template and generate at least one refined synthetic metadata conditioned instruction 604.

FIG. 6B depicts an example prompt template for a sequence processing model to iteratively prompt the model to improve a base instruction. Note that the system can generate multiple action items for a single pair of use case and skills. In an example implementation, the model Adaptation system can randomly sample an action item from $a_i$ to prompt the LLM. This design enables controlled difficulty increase, while also avoiding possible confusion between different actions to the LLM.

Figure 7:
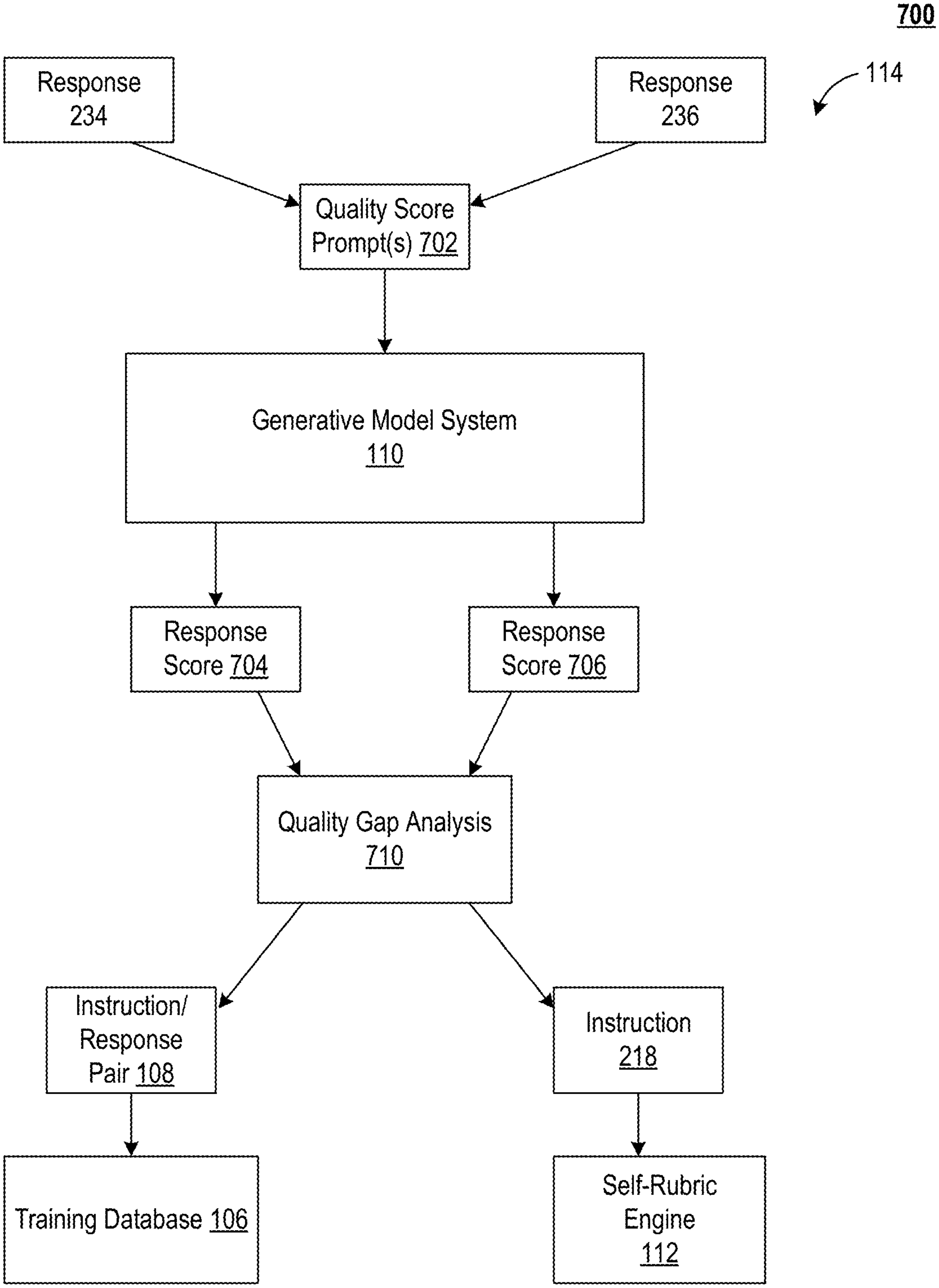
FIG. 7 is a block diagram depicting an example computing environment including a contrastive filtering engine that is configured to identify and filter effective instruction-response pairs by leveraging quality differences between model outputs according to example embodiments of the present disclosure.

FIG. 7 is a block diagram depicting an example computing environment 700 including a contrastive filtering engine 114 configured to identify and filter effective instruction-response pairs by leveraging quality differences between model outputs according to example embodiments of the present disclosure. If the space of all natural language sequences is defined as $\mathcal{N}$. The strong LLM $f_s$ can be set forth as $\mathcal{N} \rightarrow \mathcal{N}$, the target LLM $f_t$ can be set forth as $\mathcal{N} \rightarrow \mathcal{N}$. A scoring function $S: \mathcal{N} \rightarrow \mathbb{R}$ can be defined to evaluate response quality.

Contrastive filtering engine 114 of model adaptation system 102 can access response 211 from the sequence processing model of the generative model system and response 221 from the target sequence processing model. Given an input instruction $I \in \mathcal{N}$, the strong LLM can generate response 211, denoted $f_s(I)$ and the target LLM can generate response 213 denoted $f_t(I)$.

Contrastive filtering engine 114 can generate one or more quality score prompt(s) including response 234 and 236. Contrastive filtering engine 114 can provide the prompt(s) to one or more sequence processing models of generative model system 110 to score each response. The one or more sequence processing models can process response 234 and response 236 and determine a response score 704 for response 234 and a response score 706 for response 236. The response scores can undergo a quality gap analysis 710 to determine a quality gap between the two responses to estimate the usefulness of the instruction.

In an example implementation, the quality gap $G: \mathcal{N} \rightarrow \mathbb{R}$ between the two responses can be defined as set forth in equation 1 to estimate the usefulness of the instruction I.

$$G(I) = S(f_s(I)) - S(f_t(I)) \quad \text{Equation 1}$$

G indicates the degree to which the target LLM can benefit from the strong LLM for each instruction I. One or more threshold criteria such as a predetermined threshold θ for the quality gap can be defined. If $G(I)>\theta$, where $\theta \in \mathbb{R}$ is a predetermined threshold, it indicates that the strong LLM provided a much better response than the target LLM. In this instance, the contrastive filtering engine can add the instruction/response pair $(I, f_s(I))$ 108 to the training database 106, also referred to as the high-quality instruction response pool $D_g$.

If the absolute value of G(I) is less than or equal to the threshold (i.e., $|G(I)|\leq\theta$), this can indicate that the quality of the responses from both LLMs is similar. In this case, it may not be beneficial to train using this specific instruction as it is unlikely to lead to significant gain. As such, instruction I can be returned to the self-rubric engine for a next self-rubrics iteration for further improvement.

In some instances, a third possible case can be defined where G(I) is less than the negative of the threshold (i.e., $G(I)<-\theta$). In the situation where G(I) is less than −θ, the target LLM provides a much better response than the strong LLM. In this case, the instruction response pair $(I, f_t(I))$ can be added to the training database 106 ($D_g$). The instruction-response pair can serve as an implicit regularization to keep the target LLM's desirable behavior to certain instructions.

Example Methods

Figure 8:
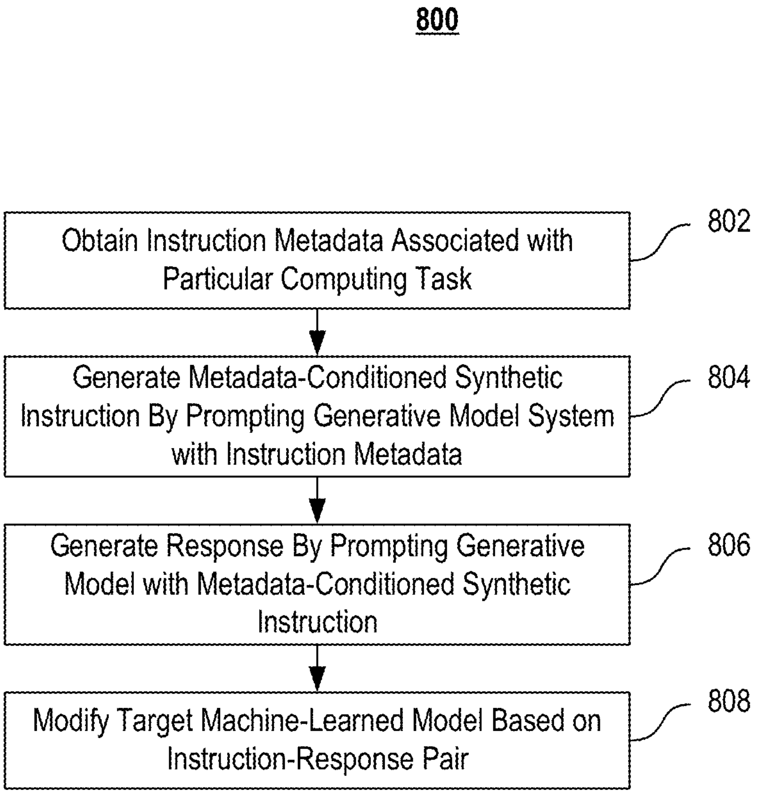
FIG. 8 is a flow chart diagram illustrating an example method for modifying a target machine-learned model using task-specific training data according to example implementations of aspects of the present disclosure.

FIG. 8 is a flow chart diagram illustrating an example method for modifying a target machine-learned model using task-specific training data according to example implementations of aspects of the present disclosure. One or more portion(s) of example method 800 and the other methods described herein can be implemented by a computing system that includes one or more computing devices such as, for example, computing systems described with reference to the other figures. Each respective portion of the example methods can be performed by any (or any combination) of one or more computing devices. Moreover, one or more portion(s) of the example methods can be implemented on the hardware components of the device(s) described herein, for example, to train one or more systems or models. The methods in the figures may depict elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. The example methods are described with reference to elements/terms described with respect to other systems and figures for exemplary illustrated purposes and is not meant to be limiting. One or more portions of the example methods can be performed additionally, or alternatively, by other systems.

At 802, example method 800 can include obtaining instruction metadata associated with a particular computing task. The instruction metadata can be associated with a particular downstream task. The instructions metadata can include at least one use case and at least one transferrable skill. The instruction metadata can be generated from one or more seed instructions or can include user-derived data.

At 804, method 800 can include generating one or more metadata-conditioned synthetic instructions by prompting a generative model system with instruction metadata. The generative model system can include one or more sequence processing models such as a large language model. In one example implementation, a single sequence processing model (e.g., an LLM) can be used to generate instruction metadata from seed instructions (or user-provided task descriptions) and to generate synthetic instructions from the seed instructions and the metadata. In other implementations, different sequence processing models can be used for one or more of the various generative steps of method 800.

At 806, example method 800 can include generating a response by prompting the target sequence processing model with the metadata-conditioned synthetic instruction. The target sequence processing model can include one or more sequence processing models such as large language model.

At 808, example method 800 can include modifying the target machine-learned model based on the instruction-response pair. Modifying the target machine-learned model can include training the target machine-learned model with the instruction-response pair. Modifying the target machine-learned model can include modifying weights of parameters of the machine learned sequence processing model, updating weights of parameters of the machine learned sequence processing model, replacing weights of parameter weights of the machine learned sequence processing model, adding parameter weights to the machine learned sequence processing model, replacing layers of the machine learned sequence processing model, adding layers to the machine learned sequence processing model, modifying one or more hyper-parameters of the machine learned sequence processing model, or adding one or more hyper-parameters to the machine learned sequence processing model, or any combination thereof.

Figure 9:
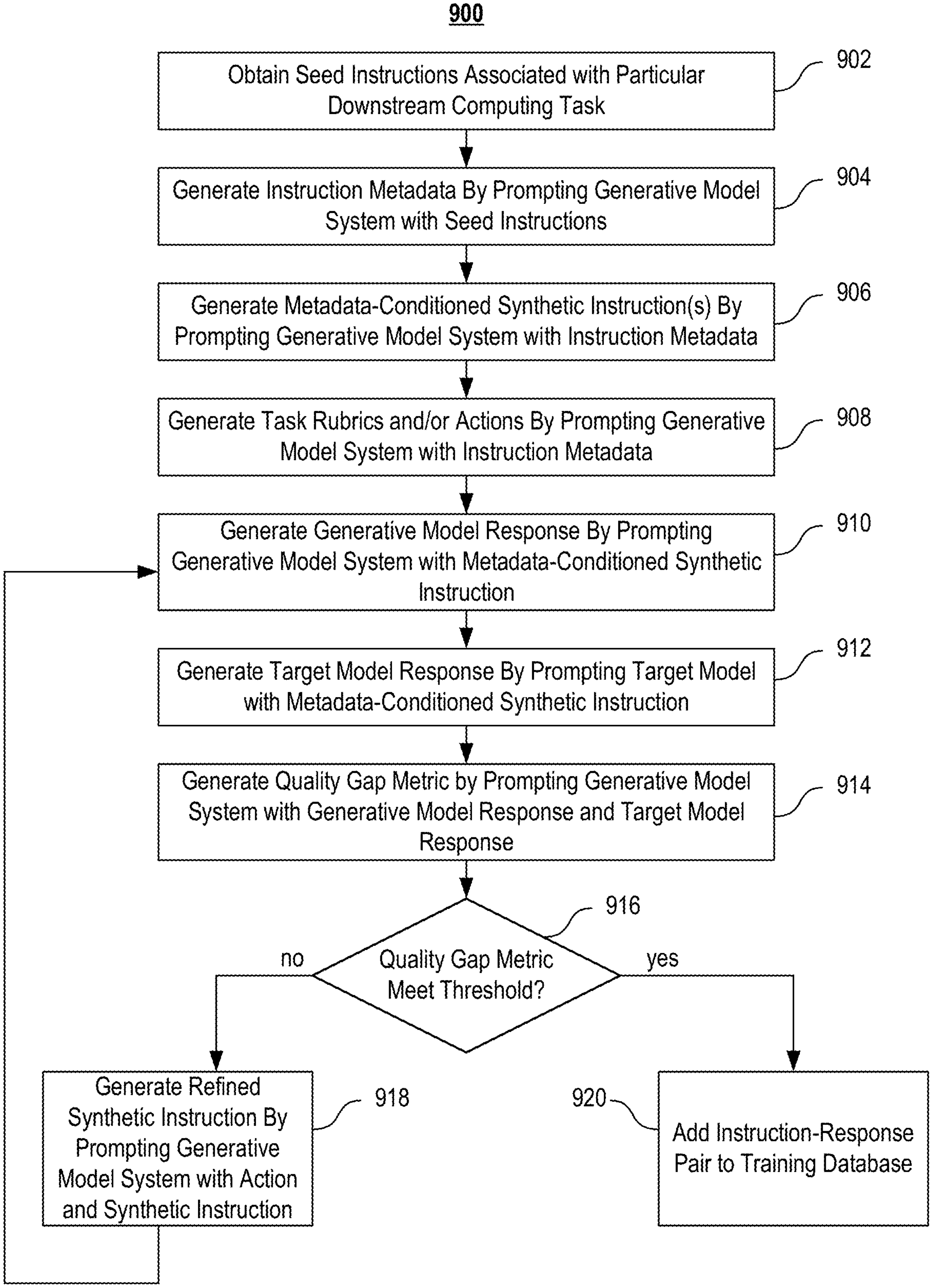
FIG. 9 is a flow chart diagram illustrating an example method for generating task-specific training data according to example implementations of aspects of the present disclosure.

FIG. 9 is a flow chart diagram illustrating an example method for generating task-specific training data according to example implementations of aspects of the present disclosure.

At 902, example method 900 can include obtaining seed instructions associated with a particular downstream computing task. The seed instructions can include one or more seed instructions such as a natural language description of a domain-specific task.

At 904, example method 900 can include generating instruction metadata by prompting a generative model system with the seed instructions. The generative model system can include one or more sequence processing models such as a large language model. The prompt can include an instruction or query to generate at least one use case and skill for the seed instruction.

At 906, example method 900 can include generating one or more metadata conditioned synthetic instructions by prompting the generative model system with instruction metadata. The generative model system can process the instruction metadata to generate one or more metadata conditioned synthetic instructions.

At 908, example method 900 can include generating task rubrics and/or actions by prompting the generative model system with the instruction metadata. The generative model system can process the instruction metadata to generate one or more rubrics and actions that correspond to the instruction metadata. The action can be in the form of a textual description, video, audio, visual representation, or other action.

At 910, example method 900 can include generating a generative model response by prompting the generative model system with the metadata conditioned synthetic instruction. The generative model system can process the metadata condition synthetic instruction to generate the generative model response. The generative model system can include one or more sequence processing models (e.g., LLM) that can process the instruction to generate the generative model response.

At 912, example method 900 can include generating a target model response by prompting the target sequence processing model with the metadata condition synthetic instruction. The target sequence processing model system can process the metadata conditioned synthetic instruction to generate the target model response.

At 914, example method 900 can include generating a quality gap metric by prompting the generative model system with the generative model response and the target model response. The generative model system can include one or more sequence processing models (e.g., LLM) that are configured to generate a response score for each model response. The contrastive filtering engine can compare the response score to determine a quality gap metric that indicates a relative usefulness of one or more responses from the generative model system versus a response from the target sequence processing model.

At 916, example method 900 can include determining whether the quality gap metric meets a predetermined threshold.

Example method 900 can continue at 918 if the quality gap metric meets the predetermined threshold. At 918, example method 900 can include adding the instruction response pair to the training database.

Example method 900 can continue at 920 if the quality gap metric does not meet the predetermined threshold. At 920, example method 900 can include generating a refined synthetic instruction by prompting the generative model system with an action and the synthetic construction.

Although not depicted, method 900 can include determining if the quality gap metric is less than the negative of the threshold. If so, this indicates that the target sequence processing model generated a much better response than the strong LLM of the generative model system. In this instance, the instruction response pair can be added to the training database so that the instruction-response pair serves as an implicit regularization to keep the target sequence processing model's desirable behavior for certain instructions.

Figure 10:
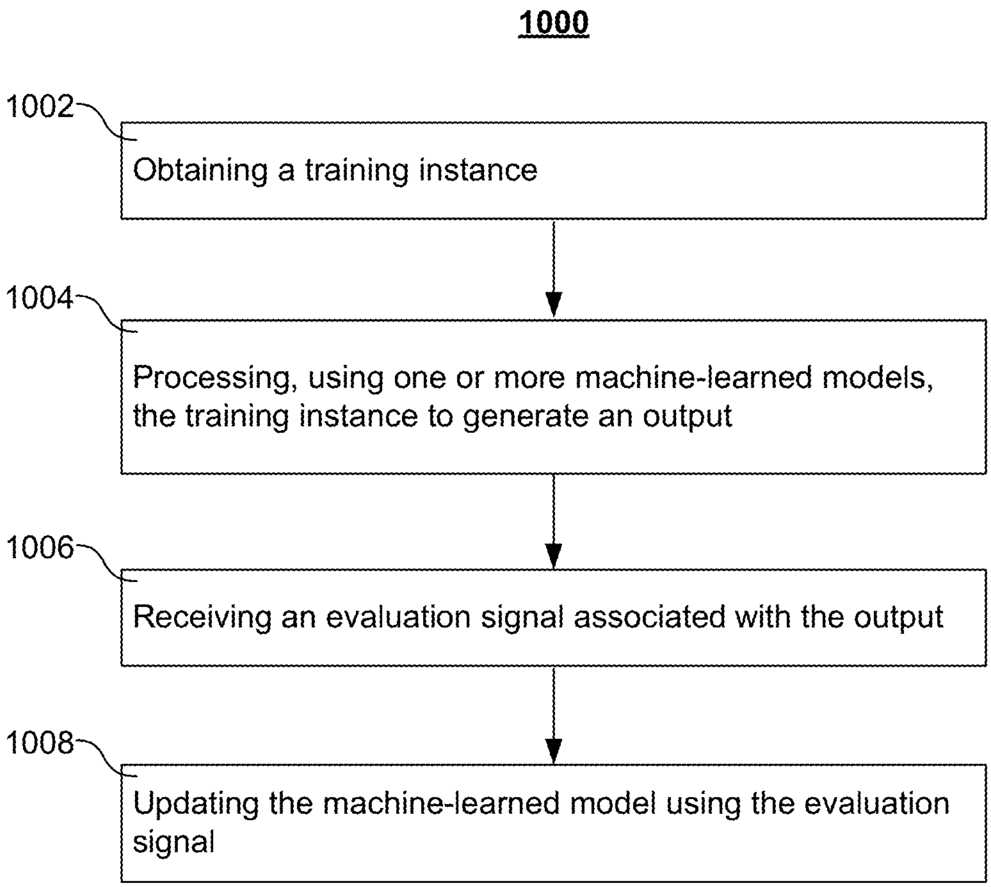
FIG. 10 is a flow chart diagram illustrating an example method for training a machine-learned model according to example implementations of aspects of the present disclosure.

FIG. 10 depicts a flowchart of a method 1000 for training one or more machine-learned models according to aspects of the present disclosure. For instance, an example machine-learned model can include a core sequence processing model such as a foundational large language model (LLM).

One or more portion(s) of example method 1000 can be implemented by a computing system that includes one or more computing devices such as, for example, computing systems described with reference to the other figures. Each respective portion of example method 1000 can be performed by any (or any combination) of one or more computing devices. Moreover, one or more portion(s) of example method 1000 can be implemented on the hardware components of the device(s) described herein, for example, to train one or more systems or models. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 10 is described with reference to elements/terms described with respect to other systems and figures for exemplary illustrated purposes and is not meant to be limiting. One or more portions of example method 1000 can be performed additionally, or alternatively, by other systems.

At 1002, example method 1000 can include obtaining a training instance. A set of training data can include a plurality of training instances divided between multiple datasets (e.g., a training dataset, a validation dataset, or testing dataset). A training instance can be labeled or unlabeled. Although referred to in example method 1000 as a "training" instance, it is to be understood that runtime inferences can form training instances when a model is trained using an evaluation of the model's performance on that runtime instance (e.g., online training/learning). Example data types for the training instance and various tasks associated therewith are described throughout the present disclosure.

At 1004, example method 1000 can include processing, using one or more machine-learned models, the training instance to generate an output. The output can be directly obtained from the one or more machine-learned models or can be a downstream result of a chain of processing operations that includes an output of the one or more machine-learned models.

At 1006, example method 1000 can include receiving an evaluation signal associated with the output. The evaluation signal can be obtained using a loss function. Various determinations of loss can be used, such as mean squared error, likelihood loss, cross entropy loss, hinge loss, contrastive loss, or various other loss functions. The evaluation signal can be computed using known ground-truth labels (e.g., supervised learning), predicted or estimated labels (e.g., semi- or self-supervised learning), or without labels (e.g., unsupervised learning). The evaluation signal can be a reward (e.g., for reinforcement learning). The reward can be computed using a machine-learned reward model configured to generate rewards based on output(s) received. The reward can be computed using feedback data describing human feedback on the output(s).

At 1008, example method 1000 can include updating the machine-learned model using the evaluation signal. For example, values for parameters of the machine-learned model(s) can be learned, in some embodiments, using various training or learning techniques, such as, for example, backwards propagation. For example, the evaluation signal can be backpropagated from the output (or another source of the evaluation signal) through the machine-learned model(s) to update one or more parameters of the model(s) (e.g., based on a gradient of the evaluation signal with respect to the parameter value(s)). For example, system(s) containing one or more machine-learned models can be trained in an end-to-end manner. Gradient descent techniques can be used to iteratively update the parameters over a number of training iterations. In some implementations, performing backwards propagation of errors can include performing truncated backpropagation through time. Example method 1000 can include implementing a number of generalization techniques (e.g., weight decays, dropouts, etc.) to improve the generalization capability of the models being trained.

In some implementations, example method 1000 can be implemented for training a machine-learned model from an initialized state to a fully trained state (e.g., when the model exhibits a desired performance profile, such as based on accuracy, precision, recall, etc.).

In some implementations, example method 1000 can be implemented for particular stages of a training procedure. For instance, in some implementations, example method 1000 can be implemented for pre-training a machine-learned model. Pre-training can include, for instance, large-scale training over potentially noisy data to achieve a broad base of performance levels across a variety of tasks/data types. In some implementations, example method 1000 can be implemented for fine-tuning a machine-learned model. Fine-tuning can include, for instance, smaller-scale training on higher-quality (e.g., labeled, curated, etc.) data. Fine-tuning can affect all or a portion of the parameters of a machine-learned model. For example, various portions of the machine-learned model can be "frozen" for certain training stages. For example, parameters associated with an embedding space can be "frozen" during fine-tuning (e.g., to retain information learned from a broader domain(s) than present in the fine-tuning dataset(s)). An example fine-tuning approach includes reinforcement learning. Reinforcement learning can be based on user feedback on model performance during use.

Example Machine-Learned Models

Figure 11:
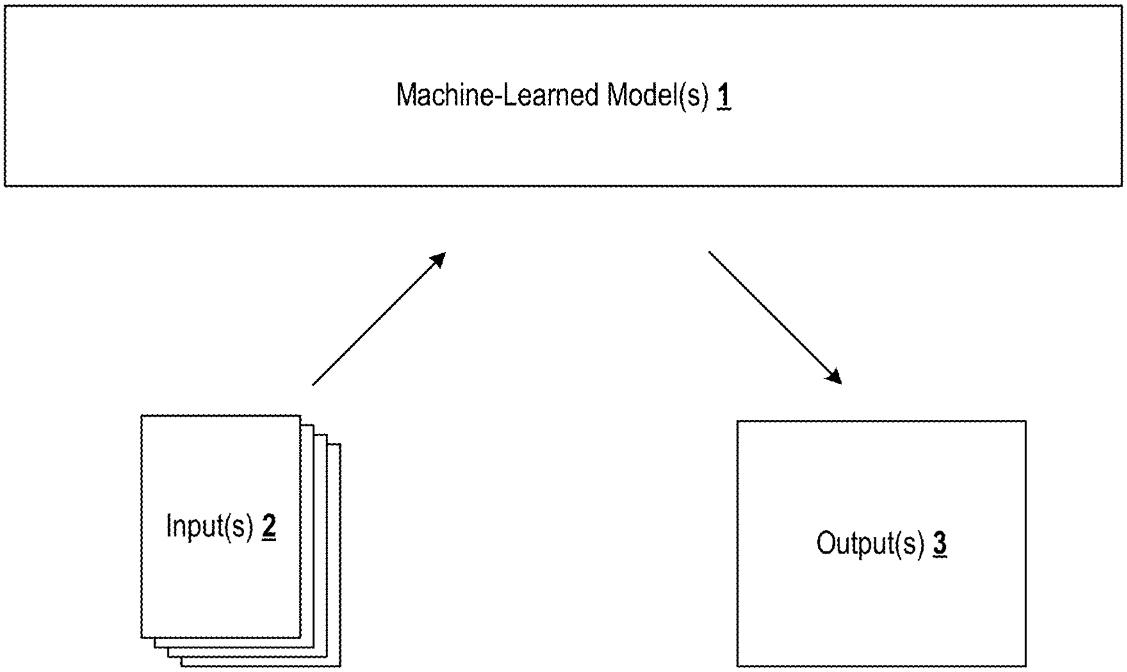
FIG. 11 is a block diagram of an example processing flow for using machine-learned model(s) to process input(s) to generate output(s) according to example embodiments of the present disclosure.

FIG. 11 is a block diagram of an example processing flow for using machine-learned model(s) 1 to process input(s) 2 to generate output(s) 3.

Machine-learned model(s) 1 can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

Machine-learned model(s) 1 can include a single or multiple instances of the same model configured to operate on data from input(s) 2. Machine-learned model(s) 1 can include an ensemble of different models that can cooperatively interact to process data from input(s) 2. For example, machine-learned model(s) 1 can employ a mixture-of-experts structure. See, e.g., Zhou et al., *Mixture-of-Experts with Expert Choice Routing*, arXiv:2202.09368v2 (Oct. 14, 2022).

Input(s) 2 can generally include or otherwise represent various types of data. Input(s) 2 can include one type or many different types of data. Output(s) 3 can be data of the same type(s) or of different types of data as compared to input(s) 2. Output(s) 3 can include one type or many different types of data.

Example data types for input(s) 2 or output(s) 3 include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audiovisual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs 2 or outputs 3, example combinations of data types include image data and audio data, image data and natural language data, natural language data and software code data, image data and biometric data, sensor data and medical data, etc. It is to be understood that any combination of data types in an input 2 or an output 3 can be present.

An example input 2 can include one or multiple data types, such as the example data types noted above. An example output 3 can include one or multiple data types, such as the example data types noted above. The data type(s) of input 2 can be the same as or different from the data type(s) of output 3. It is to be understood that the example data types noted above are provided for illustrative purposes only. Data types contemplated within the scope of the present disclosure are not limited to those examples noted above.

Example Machine-Learned Sequence Processing Models

Figure 12:
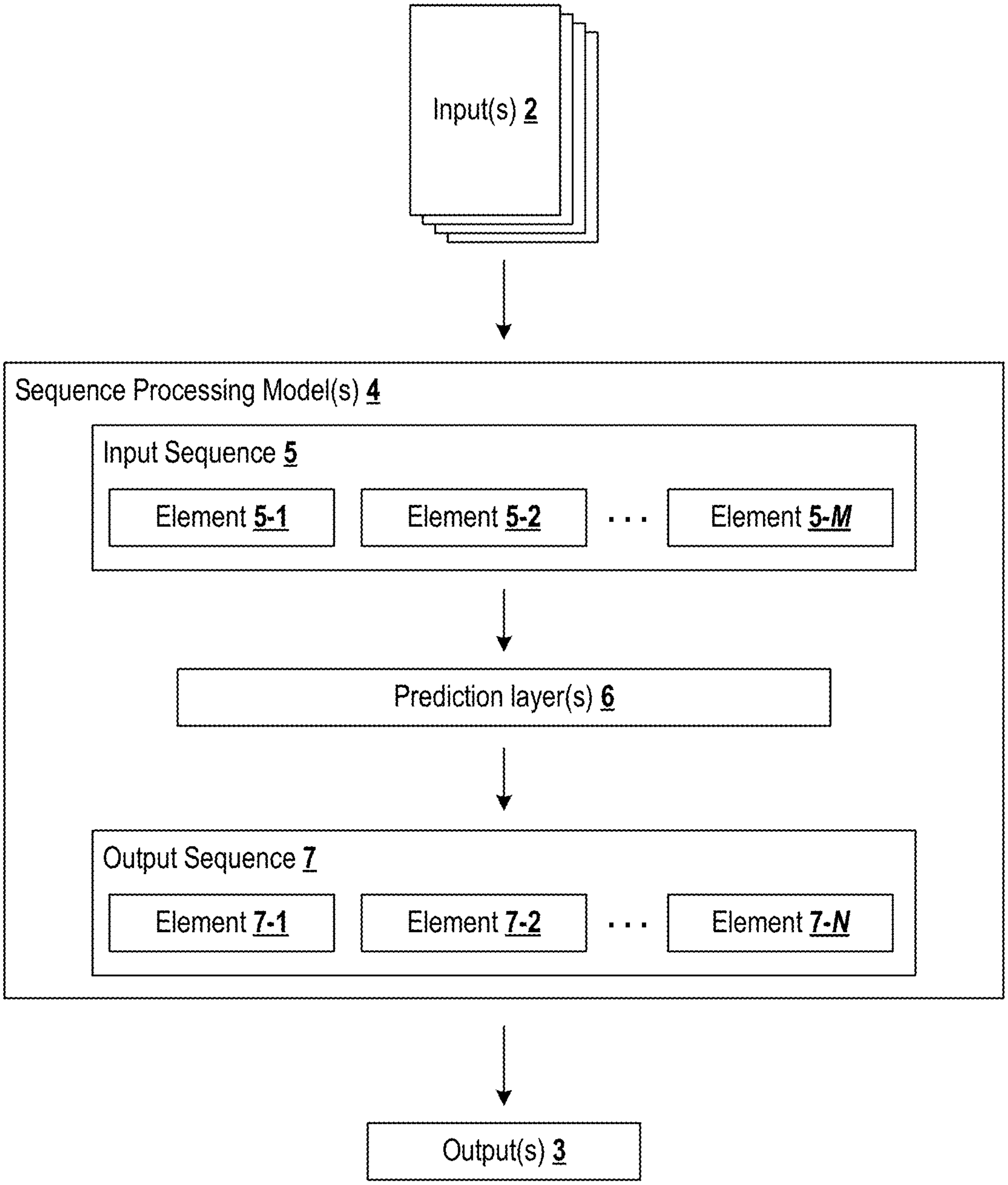
FIG. 12 is a block diagram of an example sequence processing model according to example embodiments of the present disclosure.

FIG. 12 is a block diagram of an example implementation of an example machine-learned model configured to process sequences of information. For instance, an example implementation of machine-learned model(s) 1 can include machine-learned sequence processing model(s) 4. An example system can pass input(s) 2 to sequence processing model(s) 4. Sequence processing model(s) 4 can include one or more machine-learned components. Sequence processing model(s) 4 can process the data from input(s) 2 to obtain an input sequence 5. Input sequence 5 can include one or more input elements 5-1, 5-2, . . . , 5-M, etc. obtained from input(s) 2. Sequence processing model 4 can process input sequence 5 using prediction layer(s) 6 to generate an output sequence 7. Output sequence 7 can include one or more output elements 7-1, 7-2, . . . , 7-N, etc. generated based on input sequence 5. The system can generate output(s) 3 based on output sequence 7.

Sequence processing model(s) 4 can include one or multiple machine-learned model components configured to ingest, generate, or otherwise reason over sequences of information. For example, some example sequence processing models in the text domain are referred to as "Large Language Models," or LLMs. See, e.g., PaLM 2 Technical Report, Google, https://ai.google/static/documents/palm2techreport.pdf (n.d.). Other example sequence processing models can operate in other domains, such as image domains, see, e.g., Dosovitskiy et al., *An Image is Worth* 16×16 *Words: Transformers for Image Recognition at Scale*, arXiv:2010.11929v2 (Jun. 3, 2021), audio domains, see, e.g., Agostinelli et al., *MusicLM: GeneratingMusic From Text*, arXiv:2301.11325v1 (Jan. 26, 2023), biochemical domains, see, e.g., Jumper et al., Highly accurate protein structure prediction with AlphaFold, 596 Nature 583 (Aug. 26, 2021), by way of example. Sequence processing model(s) 4 can process one or multiple types of data simultaneously. Sequence processing model(s) 4 can include relatively large models (e.g., more parameters, computationally expensive, etc.), relatively small models (e.g., fewer parameters, computationally lightweight, etc.), or both.

In general, sequence processing model(s) 4 can obtain input sequence 5 using data from input(s) 2. For instance, input sequence 5 can include a representation of data from input(s) 2 in a format understood by sequence processing model(s) 4. One or more machine-learned components of sequence processing model(s) 4 can ingest the data from input(s) 2, parse the data into pieces compatible with the processing architectures of sequence processing model(s) 4 (e.g., via "tokenization"), and project the pieces into an input space associated with prediction layer(s) 6 (e.g., via "embedding").

Sequence processing model(s) 4 can ingest the data from input(s) 2 and parse the data into a sequence of elements to obtain input sequence 5. For example, a portion of input data from input(s) 2 can be broken down into pieces that collectively represent the content of the portion of the input data. The pieces can provide the elements of the sequence.

Elements 5-1, 5-2, . . . , 5-M can represent, in some cases, building blocks for capturing or expressing meaningful information in a particular data domain. For instance, the elements can describe "atomic units" across one or more domains. For example, for textual input source(s), the elements can correspond to groups of one or more words or sub-word components, such as sets of one or more characters.

For example, elements 5-1, 5-2, . . . , 5-M can represent tokens obtained using a tokenizer. For instance, a tokenizer can process a given portion of an input source and output a series of tokens (e.g., corresponding to input elements 5-1, 5-2, . . . , 5-M) that represent the portion of the input source. Various approaches to tokenization can be used. For instance, textual input source(s) can be tokenized using a byte-pair encoding (BPE) technique. See, e.g., Kudo et al., *SentencePiece: A simple and language independent subword tokenizer and detokenizer for Neural Text Processing*, Proceedings of the 2018 Conference on Empirical Methods in Natural Language Processing (System Demonstrations), pages 66-71 (Oct. 31-Nov. 4, 2018), https://aclanthology.org/D18-2012.pdf. Image-based input source(s) can be tokenized by extracting and serializing patches from an image.

In general, arbitrary data types can be serialized and processed into input sequence 5. It is to be understood that element(s) 5-1, 5-2, . . . , 5-M depicted in FIG. 7 can be the tokens or can be the embedded representations thereof.

Prediction layer(s) 6 can predict one or more output elements 7-1, 7-2, . . . , 7-N based on the input elements. Prediction layer(s) 6 can include one or more machine-learned model architectures, such as one or more layers of learned parameters that manipulate and transform the input(s) to extract higher-order meaning from, and relationships between, input element(s) 5-1, 5-2, . . . , 5-M. In this manner, for instance, example prediction layer(s) 6 can predict new output element(s) in view of the context provided by input sequence 5.

Prediction layer(s) 6 can evaluate associations between portions of input sequence 5 and a particular output element. These associations can inform a prediction of the likelihood that a particular output follows the input context. For example, consider the textual snippet, "The carpenter's toolbox was small and heavy. It was full of ______." Example prediction layer(s) 6 can identify that "It" refers back to "toolbox" by determining a relationship between the respective embeddings. Example prediction layer(s) 6 can also link "It" to the attributes of the toolbox, such as "small" and "heavy." Based on these associations, prediction layer(s) 6 can, for instance, assign a higher probability to the word "nails" than to the word "sawdust."

A transformer is an example architecture that can be used in prediction layer(s) 6. See, e.g., Vaswani et al., *Attention Is All You Need*, arXiv:1706.03762v7 (Aug. 2, 2023). A transformer is an example of a machine-learned model architecture that uses an attention mechanism to compute associations between items within a context window. The context window can include a sequence that contains input sequence 5 and potentially one or more output element(s) 7-1, 7-2, . . . , 7-N. A transformer block can include one or more attention layer(s) and one or more post-attention layer(s) (e.g., feedforward layer(s), such as a multilayer perceptron).

Prediction layer(s) 6 can include other machine-learned model architectures in addition to or in lieu of transformer-based architectures. For example, recurrent neural networks (RNNs) and long short-term memory (LSTM) models can also be used, as well as convolutional neural networks (CNNs). In general, prediction layer(s) 6 can leverage various kinds of artificial neural networks that can understand or generate sequences of information.

Output sequence 7 can include or otherwise represent the same or different data types as input sequence 5. For instance, input sequence 5 can represent textual data, and output sequence 7 can represent textual data. Input sequence 5 can represent image, audio, or audiovisual data, and output sequence 7 can represent textual data (e.g., describing the image, audio, or audiovisual data). It is to be understood that prediction layer(s) 6, and any other interstitial model components of sequence processing model(s) 4, can be configured to receive a variety of data types in input sequence(s) 5 and output a variety of data types in output sequence(s) 7.

Output sequence 7 can have various relationships to input sequence 5. Output sequence 7 can be a continuation of input sequence 5. Output sequence 7 can be complementary to input sequence 5. Output sequence 7 can translate, transform, augment, or otherwise modify input sequence 5. Output sequence 7 can answer, evaluate, confirm, or otherwise respond to input sequence 5. Output sequence 7 can implement (or describe instructions for implementing) an instruction provided via input sequence 5.

Output sequence 7 can be generated autoregressively. For instance, for some applications, an output of one or more prediction layer(s) 6 can be passed through one or more output layers (e.g., softmax layer) to obtain a probability distribution over an output vocabulary (e.g., a textual or symbolic vocabulary) conditioned on a set of input elements in a context window. In this manner, for instance, output sequence 7 can be autoregressively generated by sampling a likely next output element, adding that element to the context window, and re-generating the probability distribution based on the updated context window, and sampling a likely next output element, and so forth.

Output sequence 7 can also be generated non-autoregressively. For instance, multiple output elements of output sequence 7 can be predicted together without explicit sequential conditioning on each other. See, e.g., Saharia et al., Non-Autoregressive Machine Translation with Latent Alignments, arXiv:2004.07437v3 (Nov. 16, 2020).

Output sequence 7 can include one or multiple portions or elements. In an example content generation configuration, output sequence 7 can include multiple elements corresponding to multiple portions of a generated output sequence (e.g., a textual sentence, values of a discretized waveform, computer code, etc.). In an example classification configuration, output sequence 7 can include a single element associated with a classification output. For instance, an output "vocabulary" can include a set of classes into which an input sequence is to be classified. For instance, a vision transformer block can pass latent state information to a multilayer perceptron that outputs a likely class value associated with an input image.

Figure 13:
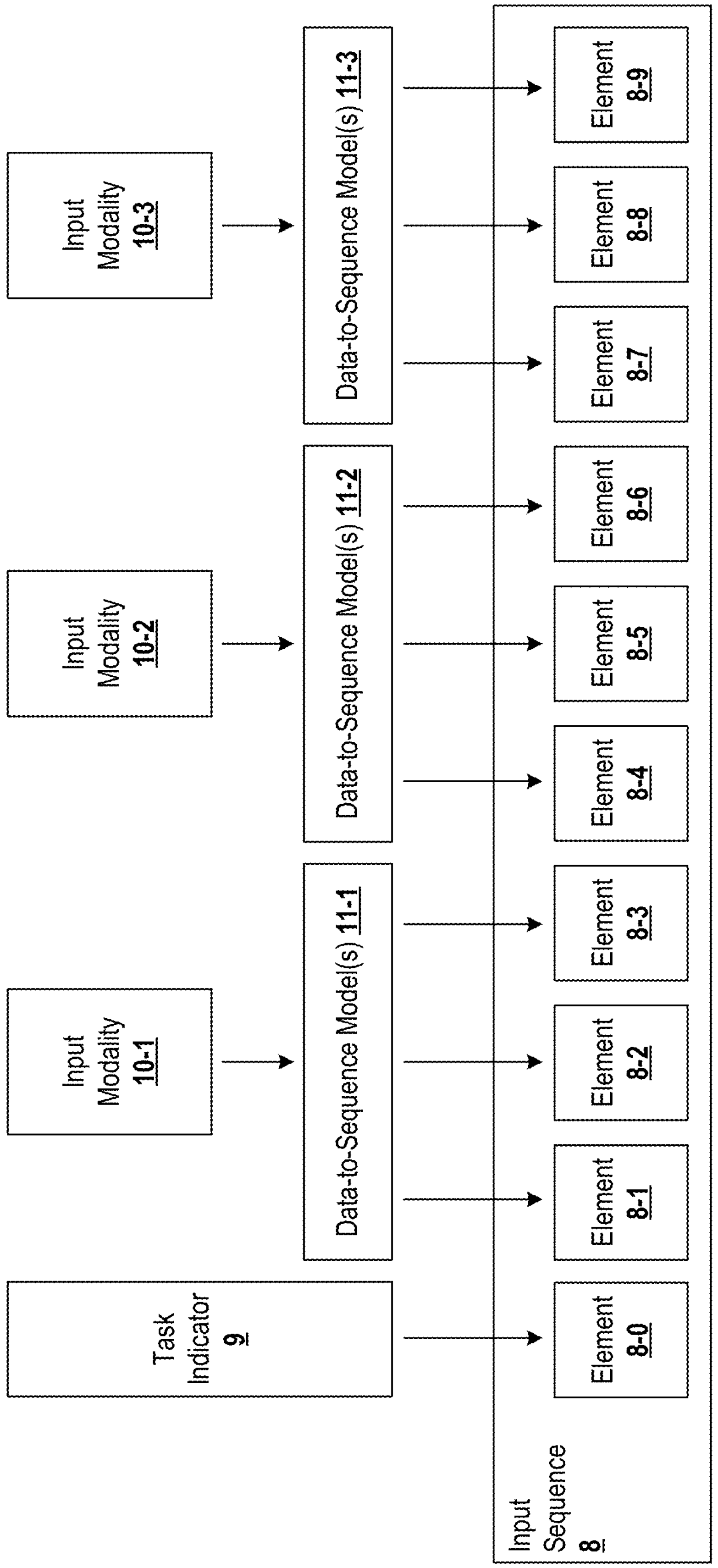
FIG. 13 is a block diagram of an example technique for populating an example input sequence for processing by a sequence processing model according to example embodiments of the present disclosure.

FIG. 13 is a block diagram of an example technique for populating an example input sequence 8. Input sequence 8 can include various functional elements that form part of the model infrastructure, such as an element 8-0 obtained from a task indicator 9 that signals to any model(s) that process input sequence 8 that a particular task is being performed (e.g., to help adapt a performance of the model(s) to that particular task). Input sequence 8 can include various data elements from different data modalities. For instance, an input modality 10-1 can include one modality of data. A data-to-sequence model 11-1 can process data from input modality 10-1 to project the data into a format compatible with input sequence 8 (e.g., one or more vectors dimensioned according to the dimensions of input sequence 8) to obtain elements 8-1, 8-2, 8-3. Another input modality 10-2 can include a different modality of data. A data-to-sequence model 11-2 can project data from input modality 10-2 into a format compatible with input sequence 8 to obtain elements 8-4, 8-5, 8-6. Another input modality 10-3 can include yet another different modality of data. A data-to-sequence model 11-3 can project data from input modality 10-3 into a format compatible with input sequence 8 to obtain elements 8-7, 8-8, 8-9.

Input sequence 8 can be the same as or different from input sequence 5. Input sequence 8 can be a multimodal input sequence that contains elements that represent data from different modalities using a common dimensional representation. For instance, an embedding space can have P dimensions. Input sequence 8 can be configured to contain a plurality of elements that have P dimensions. In this manner, for instance, example implementations can facilitate information extraction and reasoning across diverse data modalities by projecting data into elements in the same embedding space for comparison, combination, or other computations therebetween.

For example, elements 8-0, . . . , 8-9 can indicate particular locations within a multidimensional embedding space. Some elements can map to a set of discrete locations in the embedding space. For instance, elements that correspond to discrete members of a predetermined vocabulary of tokens can map to discrete locations in the embedding space that are associated with those tokens. Other elements can be continuously distributed across the embedding space. For instance, some data types can be broken down into continuously defined portions (e.g., image patches) that can be described using continuously distributed locations within the embedding space.

In some implementations, the expressive power of the embedding space may not be limited to meanings associated with any particular set of tokens or other building blocks. For example, a continuous embedding space can encode a spectrum of high-order information. An individual piece of information (e.g., a token) can map to a particular point in that space: for instance, a token for the word "dog" can be projected to an embedded value that points to a particular location in the embedding space associated with canine-related information. Similarly, an image patch of an image of a dog on grass can also be projected into the embedding space. In some implementations, the projection of the image of the dog can be similar to the projection of the word "dog" while also having similarity to a projection of the word "grass," while potentially being different from both. In some implementations, the projection of the image patch may not exactly align with any single projection of a single word. In some implementations, the projection of the image patch can align with a combination of the projections of the words "dog" and "grass." In this manner, for instance, a high-order embedding space can encode information that can be independent of data modalities in which the information is expressed.

Task indicator 9 can include a model or model component configured to identify a task being performed and inject, into input sequence 8, an input value represented by element 8-0 that signals which task is being performed. For instance, the input value can be provided as a data type associated with an input modality and projected along with that input modality (e.g., the input value can be a textual task label that is embedded along with other textual data in the input; the input value can be a pixel-based representation of a task that is embedded along with other image data in the input; etc.). The input value can be provided as a data type that differs from or is at least independent from other input(s). For instance, the input value represented by element 8-0 can be a learned within a continuous embedding space.

Input modalities 10-1, 10-2, and 10-3 can be associated with various different data types (e.g., as described above with respect to input(s) 2 and output(s) 3).

Data-to-sequence models 11-1, 11-2, and 11-3 can be the same or different from each other. Data-to-sequence models 11-1, 11-2, and 11-3 can be adapted to each respective input modality 10-1, 10-2, and 10-3. For example, a textual data-to-sequence model can subdivide a portion of input text and project the subdivisions into element(s) in input sequence 8 (e.g., elements 8-1, 8-2, 8-3, etc.). An image data-to-sequence model can subdivide an input image and project the subdivisions into element(s) in input sequence 8 (e.g., elements 8-4, 8-5, 8-6, etc.). An arbitrary datatype data-to-sequence model can subdivide an input of that arbitrary datatype and project the subdivisions into element(s) in input sequence 8 (e.g., elements 8-7, 8-8, 8-9, etc.).

Data-to-sequence models 11-1, 11-2, and 11-3 can form part of machine-learned sequence processing model(s) 4. Data-to-sequence models 11-1, 11-2, and 11-3 can be jointly trained with or trained independently from machine-learned sequence processing model(s) 4. Data-to-sequence models 11-1, 11-2, and 11-3 can be trained end-to-end with machine-learned sequence processing model(s) 4.

Example Machine-Learned Model Development Platform

Figure 14:
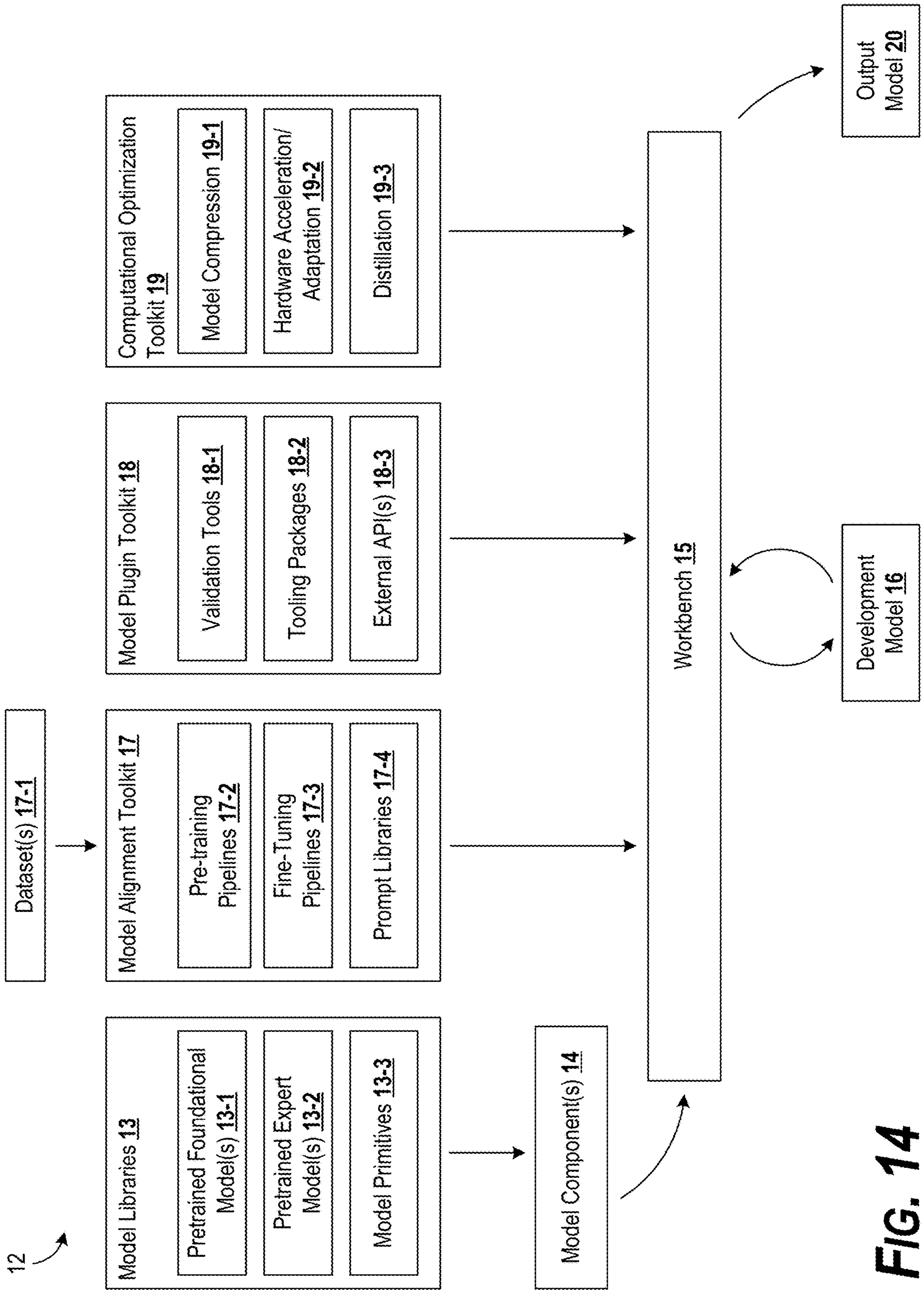
FIG. 14 is a block diagram of an example model development platform according to example embodiments of the present disclosure.

FIG. 14 is a block diagram of an example model development platform 12 that can facilitate creation, adaptation, and refinement of example machine-learned models (e.g., machine-learned model(s) 1, sequence processing model(s) 4, etc.). Model development platform 12 can provide a number of different toolkits that developer systems can employ in the development of new or adapted machine-learned models.

Model development platform 12 can provide one or more model libraries 13 containing building blocks for new models. Model libraries 13 can include one or more pre-trained foundational models 13-1, which can provide a backbone of processing power across various tasks. Model libraries 13 can include one or more pre-trained expert models 13-2, which can be focused on performance in particular domains of expertise. Model libraries 13 can include various model primitives 13-3, which can provide low-level architectures or components (optionally pre-trained), which can be assembled in various arrangements as desired.

Model development platform 12 can receive selections of various model components 14. Model development platform 12 can pass selected model components 14 to a workbench 15 that combines selected model components 14 into a development model 16.

Workbench 15 can facilitate further refinement and adaptation of development model 16 by leveraging a number of different toolkits integrated with model development platform 12. For example, workbench 15 can facilitate alignment of the development model 16 with a desired performance profile on various tasks using a model alignment toolkit 17.

Model alignment toolkit 17 can provide a number of tools for causing development model 16 to generate outputs aligned with desired behavioral characteristics. Alignment can include increasing an accuracy, precision, recall, etc. of model outputs. Alignment can include enforcing output styles, schema, or other preferential characteristics of model outputs. Alignment can be general or domain-specific. For instance, a pre-trained foundational model 13-1 can begin with an initial level of performance across multiple domains. Alignment of the pre-trained foundational model 13-1 can include improving a performance in a particular domain of information or tasks (e.g., even at the expense of performance in another domain of information or tasks).

Model alignment toolkit 17 can integrate one or more dataset(s) 17-1 for aligning development model 16. Curated dataset(s) 17-1 can include labeled or unlabeled training data. Dataset(s) 17-1 can be obtained from public domain datasets. Dataset(s) 17-1 can be obtained from private datasets associated with one or more developer system(s) for the alignment of bespoke machine-learned model(s) customized for private use-cases.

Pre-training pipelines 17-2 can include a machine-learned model training workflow configured to update development model 16 over large-scale, potentially noisy datasets. For example, pre-training can leverage unsupervised learning techniques (e.g., de-noising, etc.) to process large numbers of training instances to update model parameters from an initialized state and achieve a desired baseline performance. Pre-training pipelines 17-2 can leverage unlabeled datasets in dataset(s) 17-1 to perform pre-training. Workbench 15 can implement a pre-training pipeline 17-2 to pre-train development model 16.

Fine-tuning pipelines 17-3 can include a machine-learned model training workflow configured to refine the model parameters of development model 16 with higher-quality data. Fine-tuning pipelines 17-3 can update development model 16 by conducting supervised training with labeled dataset(s) in dataset(s) 17-1. Fine-tuning pipelines 17-3 can update development model 16 by conducting reinforcement learning using reward signals from user feedback signals. Workbench 15 can implement a fine-tuning pipeline 17-3 to fine-tune development model 16.

Prompt libraries 17-4 can include sets of inputs configured to induce behavior aligned with desired performance criteria. Prompt libraries 17-4 can include few-shot prompts (e.g., inputs providing examples of desired model outputs for prepending to a desired runtime query), chain-of-thought prompts (e.g., inputs providing step-by-step reasoning within the exemplars to facilitate thorough reasoning by the model), and the like.

Example prompts can be retrieved from an available repository of prompt libraries 17-4. Example prompts can be contributed by one or more developer systems using workbench 15.

In some implementations, pre-trained or fine-tuned models can achieve satisfactory performance without exemplars in the inputs. For instance, zero-shot prompts can include inputs that lack exemplars. Zero-shot prompts can be within a domain within a training dataset or outside of the training domain(s).

Prompt libraries 17-4 can include one or more prompt engineering tools. Prompt engineering tools can provide workflows for retrieving or learning optimized prompt values. Prompt engineering tools can facilitate directly learning prompt values (e.g., input element values) based one or more training iterations. Workbench 15 can implement prompt engineering tools in development model 16.

Prompt libraries 17-4 can include pipelines for prompt generation. For example, inputs can be generated using development model 16 itself or other machine-learned models. In this manner, for instance, a first model can process information about a task and output a input for a second model to process in order to perform a step of the task. The second model can be the same as or different from the first model. Workbench 15 can implement prompt generation pipelines in development model 16.

Prompt libraries 17-4 can include pipelines for context injection. For instance, performance of development model 16 on a particular task can improve if provided with additional context for performing the task. Prompt libraries 17-4 can include software components configured to identify desired context, retrieve the context from an external source (e.g., a database, a sensor, etc.), and add the context to the input prompt. Workbench 15 can implement context injection pipelines in development model 16.

Although various training examples described herein with respect to model development platform 12 refer to "pre-training" and "fine-tuning," it is to be understood that model alignment toolkit 17 can generally support a wide variety of training techniques adapted for training a wide variety of machine-learned models. Example training techniques can correspond to the example training method 1000 described above.

Model development platform 12 can include a model plugin toolkit 18. Model plugin toolkit 18 can include a variety of tools configured for augmenting the functionality of a machine-learned model by integrating the machine-learned model with other systems, devices, and software components. For instance, a machine-learned model can use tools to increase performance quality where appropriate. For instance, deterministic tasks can be offloaded to dedicated tools in lieu of probabilistically performing the task with an increased risk of error. For instance, instead of autoregressively predicting the solution to a system of equations, a machine-learned model can recognize a tool to call for obtaining the solution and pass the system of equations to the appropriate tool. The tool can be a traditional system of equations solver that can operate deterministically to resolve the system of equations. The output of the tool can be returned in response to the original query. In this manner, tool use can allow some example models to focus on the strengths of machine-learned models—e.g., understanding an intent in an unstructured request for a task—while augmenting the performance of the model by offloading certain tasks to a more focused tool for rote application of deterministic algorithms to a well-defined problem.

Model plugin toolkit 18 can include validation tools 18-1. Validation tools 18-1 can include tools that can parse and confirm output(s) of a machine-learned model. Validation tools 18-1 can include engineered heuristics that establish certain thresholds applied to model outputs. For example, validation tools 18-1 can ground the outputs of machine-learned models to structured data sources (e.g., to mitigate "hallucinations").

Model plugin toolkit 18 can include tooling packages 18-2 for implementing one or more tools that can include scripts or other executable code that can be executed alongside development model 16. Tooling packages 18-2 can include one or more inputs configured to cause machine-learned model(s) to implement the tools (e.g., few-shot prompts that induce a model to output tool calls in the proper syntax, etc.). Tooling packages 18-2 can include, for instance, fine-tuning training data for training a model to use a tool.

Model plugin toolkit 18 can include interfaces for calling external application programming interfaces (APIs) 18-3. For instance, in addition to or in lieu of implementing tool calls or tool code directly with development model 16, development model 16 can be aligned to output instruction that initiate API calls to send or obtain data via external systems.

Model plugin toolkit 18 can integrate with prompt libraries 17-4 to build a catalog of available tools for use with development model 16. For instance, a model can receive, in an input, a catalog of available tools, and the model can generate an output that selects a tool from the available tools and initiates a tool call for using the tool.

Model development platform 12 can include a computational optimization toolkit 19 for optimizing a computational performance of development model 16. For instance, tools for model compression 19-1 can allow development model 16 to be reduced in size while maintaining a desired level of performance. For instance, model compression 19-1 can include quantization workflows, weight pruning and sparsification techniques, etc. Tools for hardware acceleration 19-2 can facilitate the configuration of the model storage and execution formats to operate optimally on different hardware resources. For instance, hardware acceleration 19-2 can include tools for optimally sharding models for distributed processing over multiple processing units for increased bandwidth, lower unified memory requirements, etc. Tools for distillation 19-3 can provide for the training of lighter-weight models based on the knowledge encoded in development model 16. For instance, development model 16 can be a highly performant, large machine-learned model optimized using model development platform 12. To obtain a lightweight model for running in resource-constrained environments, a smaller model can be a "student model" that learns to imitate development model 16 as a "teacher model." In this manner, for instance, the investment in learning the parameters and configurations of development model 16 can be efficiently transferred to a smaller model for more efficient inference.

Workbench 15 can implement one, multiple, or none of the toolkits implemented in model development platform 12. Workbench 15 can output an output model 20 based on development model 16. Output model 20 can be a deployment version of development model 16. Output model 20 can be a development or training checkpoint of development model 16. Output model 20 can be a distilled, compressed, or otherwise optimized version of development model 16.

Figure 15:
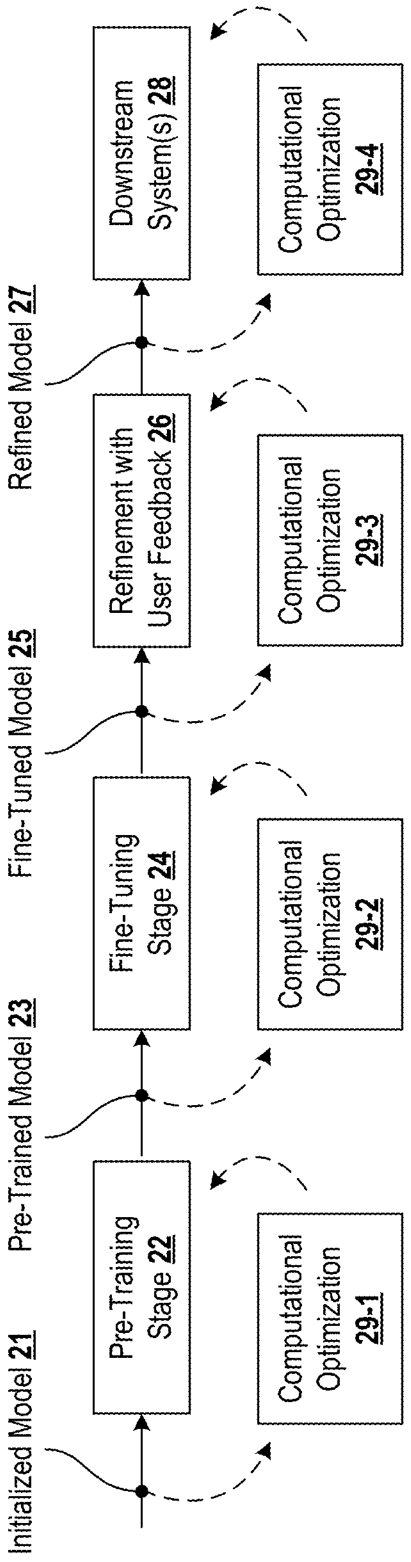
FIG. 15 is a block diagram of an example training workflow for training a machine-learned model according to example embodiments of the present disclosure.

FIG. 15 is a block diagram of an example training flow for training a machine-learned development model 16. One or more portion(s) of the example training flow can be implemented by a computing system that includes one or more computing devices such as, for example, computing systems described with reference to the other figures. Each respective portion of the example training flow can be performed by any (or any combination) of one or more computing devices. Moreover, one or more portion(s) of the example training flow can be implemented on the hardware components of the device(s) described herein, for example, to train one or more systems or models. FIG. 15 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 15 is described with reference to elements/terms described with respect to other systems and figures for exemplary illustrated purposes and is not meant to be limiting. One or more portions of the example training flow can be performed additionally, or alternatively, by other systems.

Initially, development model 16 can persist in an initial state as an initialized model 21. Development model 16 can be initialized with weight values. Initial weight values can be random or based on an initialization schema. Initial weight values can be based on prior pre-training for the same or for a different model.

Initialized model 21 can undergo pre-training in a pre-training stage 22. Pre-training stage 22 can be implemented using one or more pre-training pipelines 17-2 over data from dataset(s) 17-1. Pre-training can be omitted, for example, if initialized model 21 is already pre-trained (e.g., development model 16 contains, is, or is based on a pre-trained foundational model or an expert model).

Pre-trained model 23 can then be a new version of development model 16, which can persist as development model 16 or as a new development model. Pre-trained model 23 can be the initial state if development model 16 was already pre-trained. Pre-trained model 23 can undergo fine-tuning in a fine-tuning stage 24. Fine-tuning stage 24 can be implemented using one or more fine-tuning pipelines 17-3 over data from dataset(s) 17-1. Fine-tuning can be omitted, for example, if a pre-trained model as satisfactory performance, if the model was already fine-tuned, or if other tuning approaches are preferred.

Fine-tuned model 29 can then be a new version of development model 16, which can persist as development model 16 or as a new development model. Fine-tuned model 29 can be the initial state if development model 16 was already fine-tuned. Fine-tuned model 29 can undergo refinement with user feedback 26. For instance, refinement with user feedback 26 can include reinforcement learning, optionally based on human feedback from human users of fine-tuned model 25. As reinforcement learning can be a form of fine-tuning, it is to be understood that fine-tuning stage 24 can subsume the stage for refining with user feedback 26. Refinement with user feedback 26 can produce a refined model 27. Refined model 27 can be output to downstream system(s) 28 for deployment or further development.

In some implementations, computational optimization operations can be applied before, during, or after each stage. For instance, initialized model 21 can undergo computational optimization 29-1 (e.g., using computational optimization toolkit 19) before pre-training stage 22. Pre-trained model 23 can undergo computational optimization 29-2

(e.g., using computational optimization toolkit 19) before fine-tuning stage 24. Fine-tuned model 25 can undergo computational optimization 29-3 (e.g., using computational optimization toolkit 19) before refinement with user feedback 26. Refined model 27 can undergo computational optimization 29-4 (e.g., using computational optimization toolkit 19) before output to downstream system(s) 28. Computational optimization(s) 29-1, . . . , 29-4 can all be the same, all be different, or include at least some different optimization techniques.

Example Machine-Learned Model Inference System

Figure 16:
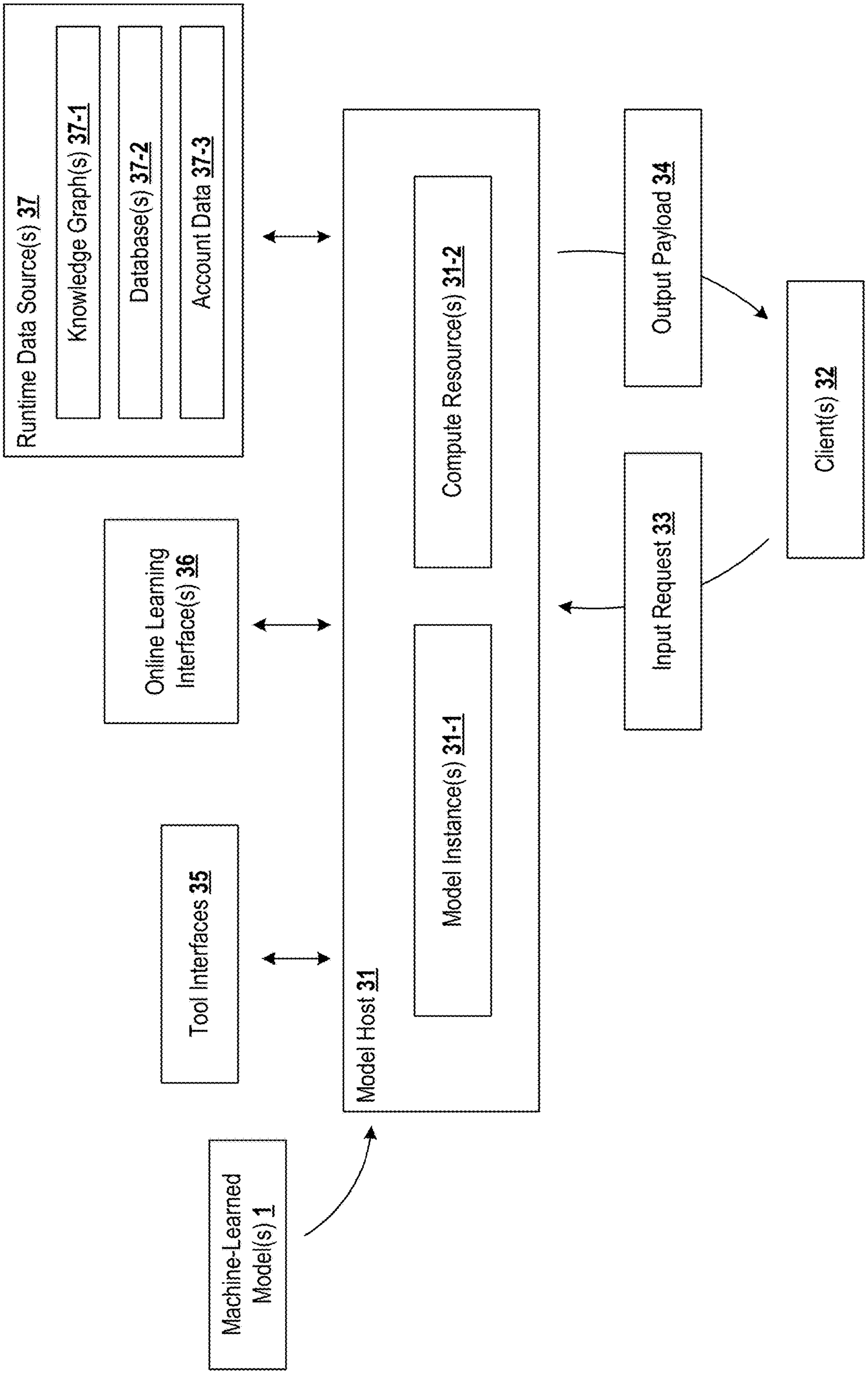
FIG. 16 is a block diagram of an inference system for operating one or more machine-learned model(s) to perform inference according to example embodiments of the present disclosure.

FIG. 16 is a block diagram of an inference system for operating one or more machine-learned model(s) 1 to perform inference (e.g., for training, for deployment, etc.). A model host 31 can receive machine-learned model(s) 1. Model host 31 can host one or more model instance(s) 31-1, which can be one or multiple instances of one or multiple models. Model host 31 can host model instance(s) 31-1 using available compute resources 31-2 associated with model host 31.

Model host 31 can perform inference on behalf of one or more client(s) 32. Client(s) 32 can transmit an input request 33 to model host 31. Using input request 33, model host 31 can obtain input(s) 2 for input to machine-learned model(s) 1. Machine-learned model(s) 1 can process input(s) 2 to generate output(s) 3. Using output(s) 3, model host 31 can return an output payload 34 for responding to input request 33 from client(s) 32. Output payload 34 can include or be based on output(s) 3.

Model host 31 can leverage various other resources and tools to augment the inference task. For instance, model host 31 can communicate with tool interfaces 35 to facilitate tool use by model instance(s) 31-1. Tool interfaces 35 can include local or remote APIs. Tool interfaces 35 can include integrated scripts or other software functionality. Model host 31 can engage online learning interface(s) 36 to facilitate ongoing improvements to machine-learned model(s) 1. For instance, online learning interface(s) 36 can be used within reinforcement learning loops to retrieve user feedback on inferences served by model host 31. Model host 31 can access runtime data source(s) 37 for augmenting input(s) 2 with additional contextual information. For instance, runtime data source(s) 37 can include a knowledge graph 37-1 that facilitates structured information retrieval for information associated with input request(s) 33 (e.g., a search engine service). Runtime data source(s) 37 can include public or private, external or local database(s) 37-2 that can store information associated with input request(s) 33 for augmenting input(s) 2. Runtime data source(s) 37 can include account data 37-3 which can be retrieved in association with a user account corresponding to a client 32 for customizing the behavior of model host 31 accordingly.

Model host 31 can be implemented by one or multiple computing devices or systems. Client(s) can be implemented by one or multiple computing devices or systems, which can include computing devices or systems shared with model host 31.

For example, model host 31 can operate on a server system that provides a machine-learning service to client device(s) that operate client(s) 32 (e.g., over a local or wide-area network). Client device(s) can be end-user devices used by individuals. Client device(s) can be server systems that operate client(s) 32 to provide various functionality as a service to downstream end-user devices.

In some implementations, model host 31 can operate on a same device or system as client(s) 32. Model host 31 can be a machine-learning service that runs on-device to provide machine-learning functionality to one or multiple applications operating on a client device, which can include an application implementing client(s) 32. Model host 31 can be a part of a same application as client(s) 32. For instance, model host 31 can be a subroutine or method implemented by one part of an application, and client(s) 32 can be another subroutine or method that engages model host 31 to perform inference functions within the application. It is to be understood that model host 31 and client(s) 32 can have various different configurations.

Model instance(s) 31-1 can include one or more machine-learned models that are available for performing inference. Model instance(s) 31-1 can include weights or other model components that are stored on in persistent storage, temporarily cached, or loaded into high-speed memory. Model instance(s) 31-1 can include multiple instance(s) of the same model (e.g., for parallel execution of more requests on the same model). Model instance(s) 31-1 can include instance(s) of different model(s). Model instance(s) 31-1 can include cached intermediate states of active or inactive model(s) used to accelerate inference of those models. For instance, an inference session with a particular model may generate significant amounts of computational results that can be re-used for future inference runs (e.g., using a KV cache for transformer-based models). These computational results can be saved in association with that inference session so that session can be executed more efficiently when resumed.

Compute resource(s) 31-2 can include one or more processors (central processing units, graphical processing units, tensor processing units, machine-learning accelerators, etc.) connected to one or more memory devices. Compute resource(s) 31-2 can include a dynamic pool of available resources shared with other processes. Compute resource(s) 31-2 can include memory devices large enough to fit an entire model instance in a single memory instance. Compute resource(s) 31-2 can also shard model instance(s) across multiple memory devices (e.g., using data parallelization or tensor parallelization, etc.). This can be done to increase parallelization or to execute a large model using multiple memory devices which individually might not be able to fit the entire model into memory.

Input request 33 can include data for input(s) 2. Model host 31 can process input request 33 to obtain input(s) 2. Input(s) 2 can be obtained directly from input request 33 or can be retrieved using input request 33. Input request 33 can be submitted to model host 31 via an API.

Model host 31 can perform inference over batches of input requests 33 in parallel. For instance, a model instance 31-1 can be configured with an input structure that has a batch dimension. Separate input(s) 2 can be distributed across the batch dimension (e.g., rows of an array). The separate input(s) 2 can include completely different contexts. The separate input(s) 2 can be multiple inference steps of the same task. The separate input(s) 2 can be staggered in an input structure, such that any given inference cycle can be operating on different portions of the respective input(s) 2. In this manner, for instance, model host 31 can perform inference on the batch in parallel, such that output(s) 3 can also contain the batch dimension and return the inference results for the batched input(s) 2 in parallel. In this manner, for instance, batches of input request(s) 33 can be processed in parallel for higher throughput of output payload(s) 34.

Output payload 34 can include or be based on output(s) 3 from machine-learned model(s) 1. Model host 31 can process output(s) 3 to obtain output payload 34. This can include chaining multiple rounds of inference (e.g., iteratively, recursively, across the same model(s) or different model(s)) to arrive at a final output for a task to be returned in output payload 34. Output payload 34 can be transmitted to client(s) 32 via an API.

Online learning interface(s) 36 can facilitate reinforcement learning of machine-learned model(s) 1. Online learning interface(s) 36 can facilitate reinforcement learning with human feedback (RLIF). Online learning interface(s) 36 can facilitate federated learning of machine-learned model(s) 1.

Model host 31 can execute machine-learned model(s) 1 to perform inference for various tasks using various types of data. For example, various different input(s) 2 and output(s) 3 can be used for various different tasks. In some implementations, input(s) 2 can be or otherwise represent image data. Machine-learned model(s) 1 can process the image data to generate an output. As an example, machine-learned model(s) 1 can process the image data to generate an image recognition output (e.g., a recognition of the image data, a latent embedding of the image data, an encoded representation of the image data, a hash of the image data, etc.). As another example, machine-learned model(s) 1 can process the image data to generate an image segmentation output. As another example, machine-learned model(s) 1 can process the image data to generate an image classification output. As another example, machine-learned model(s) 1 can process the image data to generate an image data modification output (e.g., an alteration of the image data, etc.). As another example, machine-learned model(s) 1 can process the image data to generate an encoded image data output (e.g., an encoded and/or compressed representation of the image data, etc.). As another example, machine-learned model(s) 1 can process the image data to generate an upscaled image data output. As another example, machine-learned model(s) 1 can process the image data to generate a prediction output.

In some implementations, the task is a computer vision task. In some cases, input(s) 2 includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some implementations, input(s) 2 can be or otherwise represent natural language data. Machine-learned model(s) 1 can process the natural language data to generate an output. As an example, machine-learned model(s) 1 can process the natural language data to generate a language encoding output. As another example, machine-learned model(s) 1 can process the natural language data to generate a latent text embedding output. As another example, machine-learned model(s) 1 can process the natural language data to generate a translation output. As another example, machine-learned model(s) 1 can process the natural language data to generate a classification output. As another example, machine-learned model(s) 1 can process the natural language data to generate a textual segmentation output. As another example, machine-learned model(s) 1 can process the natural language data to generate a semantic intent output. As another example, machine-learned model(s) 1 can process the natural language data to generate an upscaled text or natural language output (e.g., text or natural language data that is higher quality than the input text or natural language, etc.). As another example, machine-learned model(s) 1 can process the natural language data to generate a prediction output (e.g., one or more predicted next portions of natural language content).

In some implementations, input(s) 2 can be or otherwise represent speech data (e.g., data describing spoken natural language, such as audio data, textual data, etc.). Machine-learned model(s) 1 can process the speech data to generate an output. As an example, machine-learned model(s) 1 can process the speech data to generate a speech recognition output. As another example, machine-learned model(s) 1 can process the speech data to generate a speech translation output. As another example, machine-learned model(s) 1 can process the speech data to generate a latent embedding output. As another example, machine-learned model(s) 1 can process the speech data to generate an encoded speech output (e.g., an encoded and/or compressed representation of the speech data, etc.). As another example, machine-learned model(s) 1 can process the speech data to generate an upscaled speech output (e.g., speech data that is higher quality than the input speech data, etc.). As another example, machine-learned model(s) 1 can process the speech data to generate a textual representation output (e.g., a textual representation of the input speech data, etc.). As another example, machine-learned model(s) 1 can process the speech data to generate a prediction output.

In some implementations, input(s) 2 can be or otherwise represent latent encoding data (e.g., a latent space representation of an input, etc.). Machine-learned model(s) 1 can process the latent encoding data to generate an output. As an example, machine-learned model(s) 1 can process the latent encoding data to generate a recognition output. As another example, machine-learned model(s) 1 can process the latent encoding data to generate a reconstruction output. As another example, machine-learned model(s) 1 can process the latent encoding data to generate a search output. As another example, machine-learned model(s) 1 can process the latent encoding data to generate a reclustering output. As another example, machine-learned model(s) 1 can process the latent encoding data to generate a prediction output.

In some implementations, input(s) 2 can be or otherwise represent statistical data. Statistical data can be, represent, or otherwise include data computed and/or calculated from some other data source. Machine-learned model(s) 1 can process the statistical data to generate an output. As an example, machine-learned model(s) 1 can process the statistical data to generate a recognition output. As another example, machine-learned model(s) 1 can process the statistical data to generate a prediction output. As another example, machine-learned model(s) 1 can process the statistical data to generate a classification output. As another example, machine-learned model(s) 1 can process the statistical data to generate a segmentation output. As another example, machine-learned model(s) 1 can process the statistical data to generate a visualization output. As another example, machine-learned model(s) 1 can process the statistical data to generate a diagnostic output.

In some implementations, input(s) 2 can be or otherwise represent sensor data. Machine-learned model(s) 1 can process the sensor data to generate an output. As an example, machine-learned model(s) 1 can process the sensor data to generate a recognition output. As another example, machine-learned model(s) 1 can process the sensor data to generate a prediction output. As another example, machine-learned model(s) 1 can process the sensor data to generate a classification output. As another example, machine-learned model(s) 1 can process the sensor data to generate a segmentation output. As another example, machine-learned model(s) 1 can process the sensor data to generate a visualization output. As another example, machine-learned model(s) 1 can process the sensor data to generate a diagnostic output. As another example, machine-learned model(s) 1 can process the sensor data to generate a detection output.

In some implementations, machine-learned model(s) 1 can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data). In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some implementations, the task is a generative task, and machine-learned model(s) 1 can be configured to output content generated in view of input(s) 2. For instance, input(s) 2 can be or otherwise represent data of one or more modalities that encodes context for generating additional content.

In some implementations, the task can be a text completion task. Machine-learned model(s) 1 can be configured to process input(s) 2 that represent textual data and to generate output(s) 3 that represent additional textual data that completes a textual sequence that includes input(s) 2. For instance, machine-learned model(s) 1 can be configured to generate output(s) 3 to complete a sentence, paragraph, or portion of text that follows from a portion of text represented by input(s) 2.

In some implementations, the task can be an instruction following task. Machine-learned model(s) 1 can be configured to process input(s) 2 that represent instructions to perform a function and to generate output(s) 3 that advance a goal of satisfying the instruction function (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the instructions (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the instructions (e.g., natural language responses, programming language responses, machine language responses, etc.). One or more output(s) 3 can be iteratively or recursively generated to sequentially process and accomplish steps toward accomplishing the requested functionality. For instance, an initial output can be executed by an external system or be processed by machine-learned model(s) 1 to complete an initial step of performing a function. Multiple steps can be performed, with a final output being obtained that is responsive to the initial instructions.

In some implementations, the task can be a question answering task. Machine-learned model(s) 1 can be configured to process input(s) 2 that represent a question to answer and to generate output(s) 3 that advance a goal of returning an answer to the question (e.g., at least a step of a multi-step procedure to perform the function). Output(s) 3 can represent data of the same or of a different modality as input(s) 2. For instance, input(s) 2 can represent textual data (e.g., natural language instructions for a task to be performed) and machine-learned model(s) 1 can process input(s) 2 to generate output(s) 3 that represent textual data responsive to the question (e.g., natural language responses, programming language responses, machine language responses, etc.). Input(s) 2 can represent image data (e.g., image-based instructions for a task to be performed, optionally accompanied by textual instructions) and machine-learned model(s) 1 can process input(s) 2 to generate output(s) 3 that represent textual data responsive to the question (e.g., natural language responses, programming language responses, machine language responses, etc.). One or more output(s) 3 can be iteratively or recursively generated to sequentially process and accomplish steps toward answering the question. For instance, an initial output can be executed by an external system or be processed by machine-learned model(s) 1 to complete an initial step of obtaining an answer to the question (e.g., querying a database, performing a computation, executing a script, etc.). Multiple steps can be performed, with a final output being obtained that is responsive to the question.

In some implementations, the task can be an image generation task. Machine-learned model(s) 1 can be configured to process input(s) 2 that represent context regarding a desired portion of image content. The context can include text data, image data, audio data, etc. Machine-learned model(s) 1 can be configured to generate output(s) 3 that represent image data that depicts imagery related to the context. For instance, machine-learned model(s) 1 can be configured to generate pixel data of an image. Values for channel(s) associated with the pixels in the pixel data can be selected based on the context (e.g., based on a probability determined based on the context).

In some implementations, the task can be an audio generation task. Machine-learned model(s) 1 can be configured to process input(s) 2 that represent context regarding a desired portion of audio content. The context can include text data, image data, audio data, etc. Machine-learned model(s) 1 can be configured to generate output(s) 3 that represent audio data related to the context. For instance, machine-learned model(s) 1 can be configured to generate waveform data in the form of an image (e.g., a spectrogram). Values for channel(s) associated with pixels of the image can be selected based on the context. Machine-learned model(s)

1 can be configured to generate waveform data in the form of a sequence of discrete samples of a continuous waveform. Values of the sequence can be selected based on the context (e.g., based on a probability determined based on the context).

In some implementations, the task can be a data generation task. Machine-learned model(s) 1 can be configured to process input(s) 2 that represent context regarding a desired portion of data (e.g., data from various data domains, such as sensor data, image data, multimodal data, statistical data, etc.). The desired data can be, for instance, synthetic data for training other machine-learned models. The context can include arbitrary data type(s). Machine-learned model(s) 1 can be configured to generate output(s) 3 that represent data that aligns with the desired data. For instance, machine-learned model(s) 1 can be configured to generate data values for populating a dataset. Values for the data object(s) can be selected based on the context (e.g., based on a probability determined based on the context).

Example Computing Systems and Devices

Figure 17:
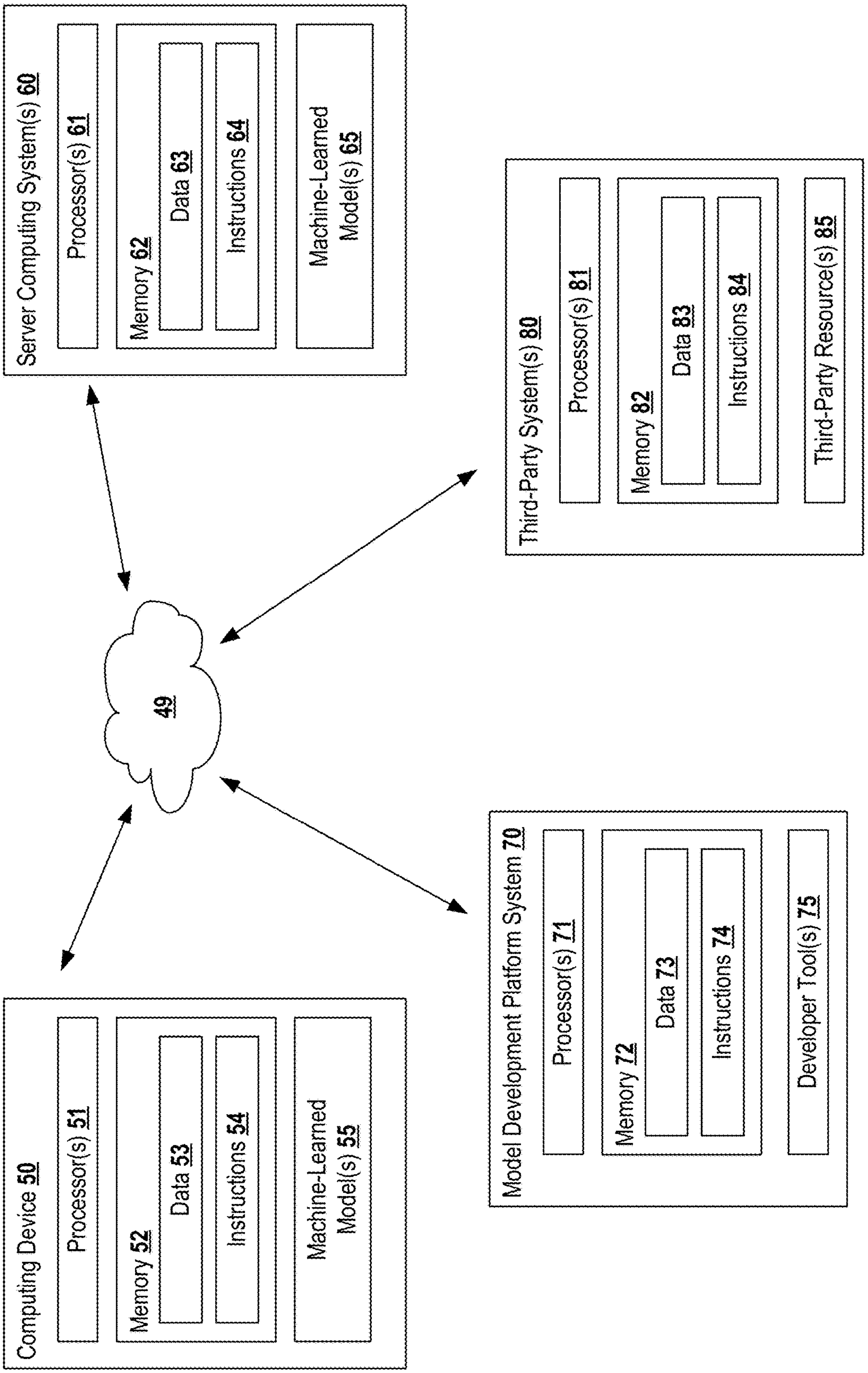
FIG. 17 is a block diagram of an example networked computing system according to example embodiments of the present disclosure.

FIG. 17 is a block diagram of an example networked computing system that can perform aspects of example implementations of the present disclosure. The system can include a number of computing devices and systems that are communicatively coupled over a network 49. An example computing device 50 is described to provide an example of a computing device that can perform any aspect of the present disclosure (e.g., implementing model host 31, client(s) 32, or both). An example server computing system 60 is described as an example of a server computing system that can perform any aspect of the present disclosure (e.g., implementing model host 31, client(s) 32, or both). Computing device 50 and server computing system(s) 60 can cooperatively interact (e.g., over network 49) to perform any aspect of the present disclosure (e.g., implementing model host 31, client(s) 32, or both). Model development platform system 70 is an example system that can host or serve model development platform(s) 12 for development of machine-learned models. Third-party system(s) 80 are example system(s) with which any of computing device 50, server computing system(s) 60, or model development platform system(s) 70 can interact in the performance of various aspects of the present disclosure (e.g., engaging third-party tools, accessing third-party databases or other resources, etc.).

Network 49 can be any type of communications network, such as a local area network (e.g., intranet), wide area network (e.g., Internet), or some combination thereof and can include any number of wired or wireless links. In general, communication over network 49 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL). Network 49 can also be implemented via a system bus. For instance, one or more devices or systems of FIG. 12 can be co-located with, contained by, or otherwise integrated into one or more other devices or systems.

Computing device 50 can be any type of computing device, such as, for example, a personal computing device (e.g., laptop or desktop), a mobile computing device (e.g., smartphone or tablet), a gaming console or controller, a wearable computing device, an embedded computing device, a server computing device, a virtual machine operating on a host device, or any other type of computing device. Computing device 50 can be a client computing device. Computing device 50 can be an end-user computing device. Computing device 50 can be a computing device of a service provided that provides a service to an end user (who may use another computing device to interact with computing device 50).

Computing device 50 can include one or more processors 51 and a memory 52. Processor(s) 51 can be any suitable processing device (e.g., a processor core, a microprocessor, an ASIC, an FPGA, a controller, a microcontroller, etc.) and can be one processor or a plurality of processors that are operatively connected. Memory 52 can include one or more non-transitory computer-readable storage media, such as HBM, RAM, ROM, EEPROM, EPROM, flash memory devices, magnetic disks, etc., and combinations thereof. Memory 52 can store data 53 and instructions 54 which can be executed by processor(s) 51 to cause computing device 50 to perform operations. The operations can implement any one or multiple features described herein. The operations can implement example methods and techniques described herein.

Computing device 50 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, camera, LIDAR, a physical keyboard or other buttons, or other means by which a user can provide user input.

Computing device 50 can store or include one or more machine-learned models 55. Machine-learned models 55 can include one or more machine-learned model(s) 1, such as a sequence processing model 4. Machine-learned models 55 can include one or multiple model instance(s) 31-1. Machine-learned model(s) 55 can be received from server computing system(s) 60, model development platform system 70, third party system(s) 80 (e.g., an application distribution platform), or developed locally on computing device 50. Machine-learned model(s) 55 can be loaded into memory 52 and used or otherwise implemented by processor (s) 51. Computing device 50 can implement multiple parallel instances of machine-learned model(s) 55.

Server computing system(s) 60 can include one or more processors 61 and a memory 62. Processor(s) 61 can be any suitable processing device (e.g., a processor core, a microprocessor, an ASIC, an FPGA, a controller, a microcontroller, etc.) and can be one processor or a plurality of processors that are operatively connected. Memory 62 can include one or more non-transitory computer-readable storage media, such as HBM, RAM, ROM, EEPROM, EPROM, flash memory devices, magnetic disks, etc., and combinations thereof. Memory 62 can store data 63 and instructions 64 which can be executed by processor(s) 61 to cause server computing system(s) 60 to perform operations. The operations can implement any one or multiple features described herein. The operations can implement example methods and techniques described herein.

In some implementations, server computing system 60 includes or is otherwise implemented by one or multiple server computing devices. In instances in which server computing system 60 includes multiple server computing devices, such server computing devices can operate according to sequential computing architectures, parallel computing architectures, or some combination thereof.

Server computing system 60 can store or otherwise include one or more machine-learned models 65. Machine-learned model(s) 65 can be the same as or different from machine-learned model(s) 55. Machine-learned models 65 can include one or more machine-learned model(s) 1, such as a sequence processing model 4. Machine-learned models 65 can include one or multiple model instance(s) 31-1. Machine-learned model(s) 65 can be received from computing device 50, model development platform system 70, third party system(s) 80, or developed locally on server computing system(s) 60. Machine-learned model(s) 65 can be loaded into memory 62 and used or otherwise implemented by processor(s) 61. Server computing system(s) 60 can implement multiple parallel instances of machine-learned model(s) 65.

In an example configuration, machine-learned models 65 can be included in or otherwise stored and implemented by server computing system 60 to establish a client-server relationship with computing device 50 for serving model inferences. For instance, server computing system(s) 60 can implement model host 31 on behalf of client(s) 32 on computing device 50. For instance, machine-learned models 65 can be implemented by server computing system 60 as a portion of a web service (e.g., remote machine-learned model hosting service, such as an online interface for performing machine-learned model operations over a network on server computing system(s) 60). For instance, server computing system(s) 60 can communicate with computing device 50 over a local intranet or internet connection. For instance, computing device 50 can be a workstation or endpoint in communication with server computing system(s) 60, with implementation of machine-learned models 65 being managed by server computing system(s) 60 to remotely perform inference (e.g., for runtime or training operations), with output(s) returned (e.g., cast, streamed, etc.) to computing device 50. Machine-learned models 65 can work cooperatively or interoperatively with machine-learned models 55 on computing device 50 to perform various tasks.

Model development platform system(s) 70 can include one or more processors 71 and a memory 72. Processor(s) 71 can be any suitable processing device (e.g., a processor core, a microprocessor, an ASIC, an FPGA, a controller, a microcontroller, etc.) and can be one processor or a plurality of processors that are operatively connected. Memory 72 can include one or more non-transitory computer-readable storage media, such as HBM, RAM, ROM, EEPROM, EPROM, flash memory devices, magnetic disks, etc., and combinations thereof. Memory 72 can store data 73 and instructions 74 which can be executed by processor(s) 71 to cause model development platform system(s) 70 to perform operations. The operations can implement any one or multiple features described herein. The operations can implement example methods and techniques described herein. Example operations include the functionality described herein with respect to model development platform 12. This and other functionality can be implemented by developer tool(s) 75.

Third-party system(s) 80 can include one or more processors 81 and a memory 82. Processor(s) 81 can be any suitable processing device (e.g., a processor core, a microprocessor, an ASIC, an FPGA, a controller, a microcontroller, etc.) and can be one processor or a plurality of processors that are operatively connected. Memory 82 can include one or more non-transitory computer-readable storage media, such as HBM, RAM, ROM, EEPROM, EPROM, flash memory devices, magnetic disks, etc., and combinations thereof. Memory 82 can store data 83 and instructions 84 which can be executed by processor(s) 81 to cause third-party system(s) 80 to perform operations. The operations can implement any one or multiple features described herein. The operations can implement example methods and techniques described herein. Example operations include the functionality described herein with respect to tools and other external resources called when training or performing inference with machine-learned model(s) 1, 4, 16, 20, 55, 65, etc. (e.g., third-party resource(s) 85).

FIG. 17 illustrates one example arrangement of computing systems that can be used to implement the present disclosure. Other computing system configurations can be used as well. For example, in some implementations, one or both of computing system 50 or server computing system(s) 60 can implement all or a portion of the operations of model development platform system 70. For example, computing system 50 or server computing system(s) 60 can implement developer tool(s) 75 (or extensions thereof) to develop, update/train, or refine machine-learned models 1, 4, 16, 20, 55, 65, etc. using one or more techniques described herein with respect to model alignment toolkit 17. In this manner, for instance, computing system 50 or server computing system(s) 60 can develop, update/train, or refine machine-learned models based on local datasets (e.g., for model personalization/customization, as permitted by user data preference selections).

Figure 18:
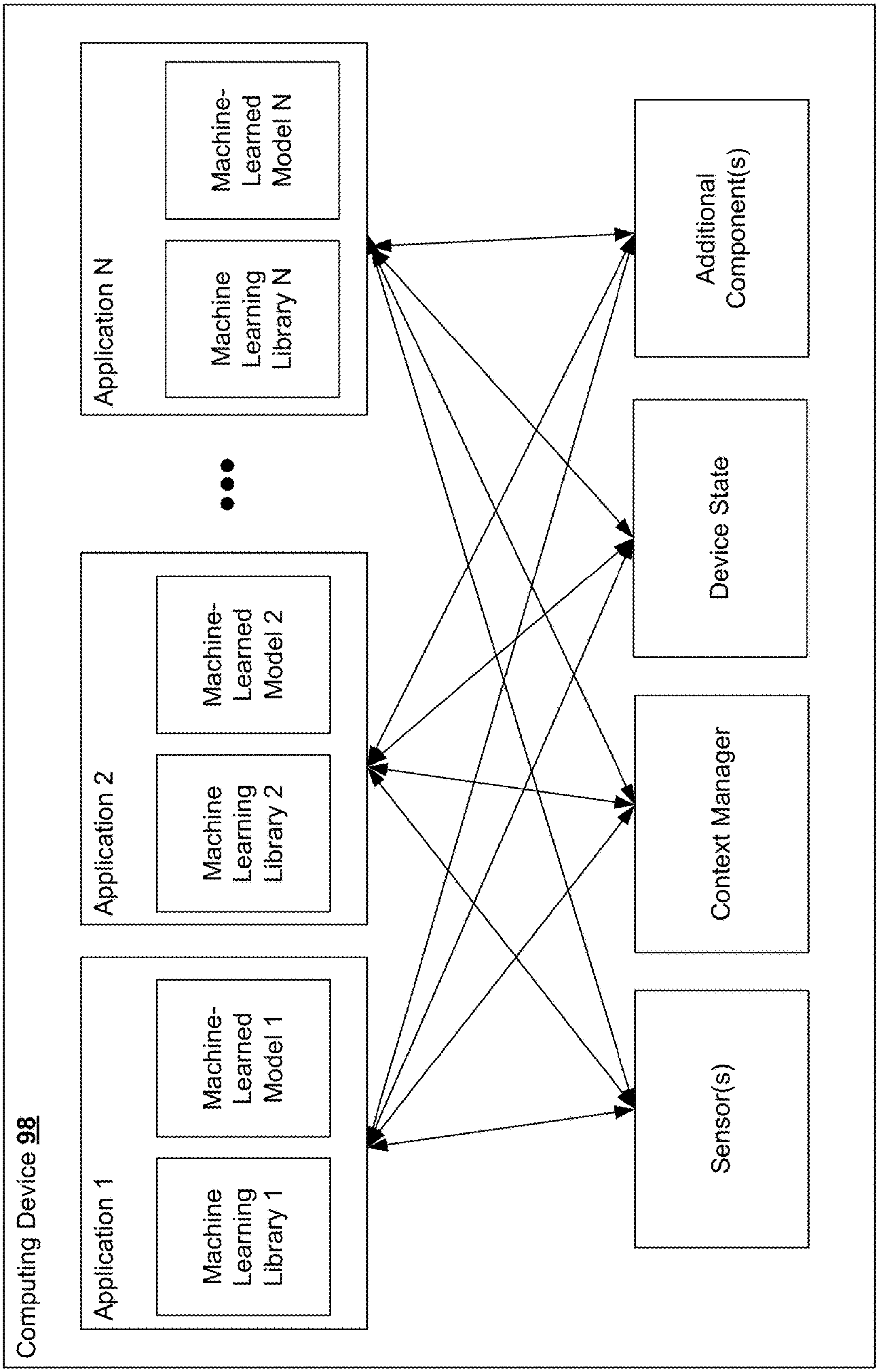
FIG. 18 is a block diagram of an example computing device according to example embodiments of the present disclosure.

FIG. 18 is a block diagram of an example computing device 98 that performs according to example embodiments of the present disclosure. Computing device 98 can be a user computing device or a server computing device (e.g., computing device 50, server computing system(s) 60, etc.). Computing device 98 can implement model host 31. For instance, computing device 98 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 14, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 19:
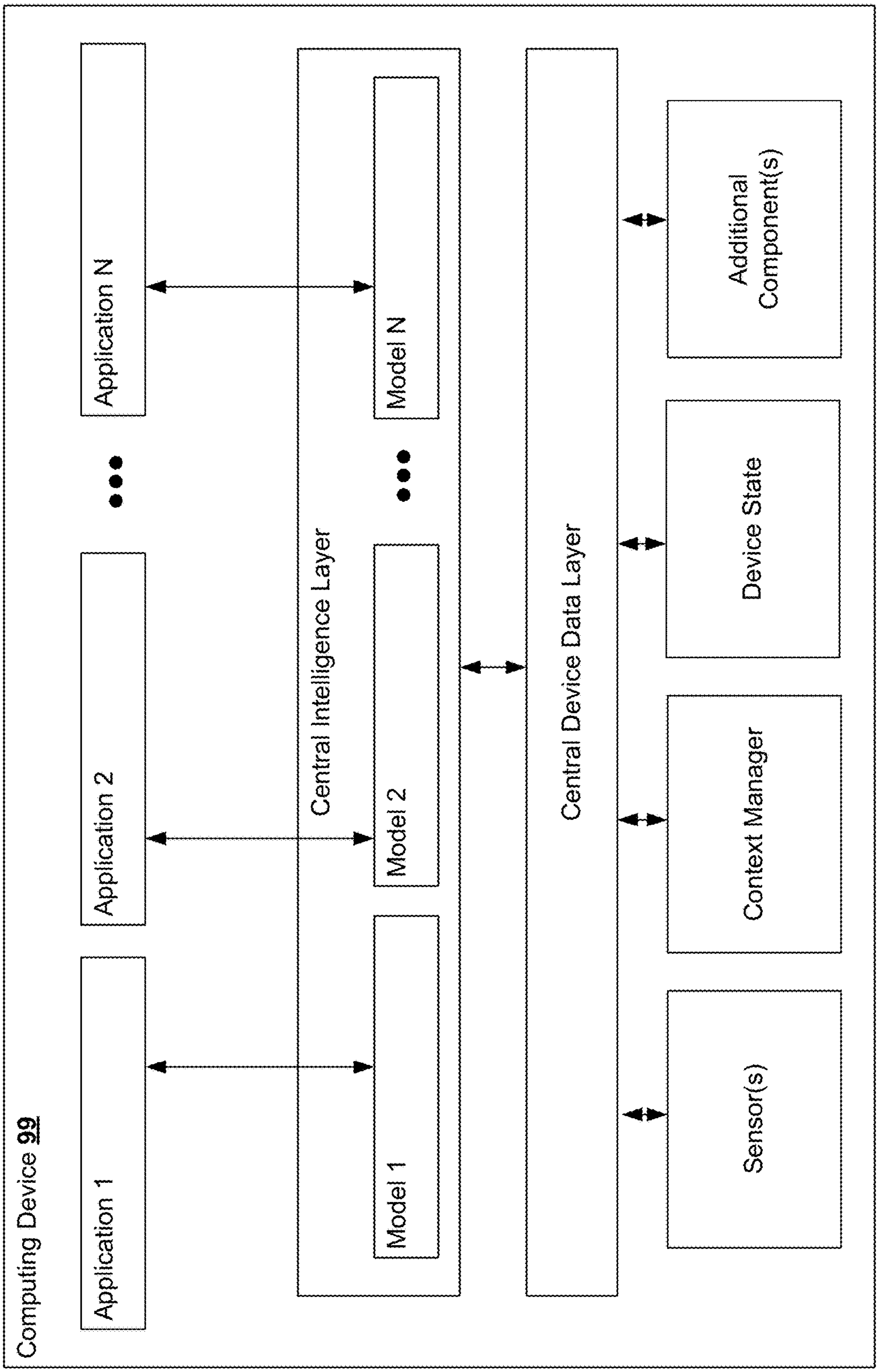
FIG. 19 is a block diagram of an example computing device according to example embodiments of the present disclosure.

FIG. 19 is a block diagram of an example computing device 99 that performs according to example embodiments of the present disclosure. Computing device 99 can be the same as or different from computing device 98. Computing device 99 can be a user computing device or a server computing device (e.g., computing device 50, server computing system(s) 60, etc.). Computing device 98 can implement model host 31. For instance, computing device 99 can include a number of applications (e.g., applications 1 through N). Each application can be in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG.

19, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of computing device 99.

The central intelligence layer can communicate with a central device data layer. The central device data layer can be a centralized repository of data for computing device 99. As illustrated in FIG. 19, the central device data layer can communicate with a number of other components of the computing device, such as, for example, one or more sensors, a context manager, a device state component, or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Terms such as "based on" should be understood as "based at least in part on."

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A computer-implemented method performed by one or more processors, the method comprising:
- obtaining instruction metadata indicative of at least one use case and at least one skill associated with a particular computing task to be performed by a target sequence processing model;
- generating a metadata-conditioned synthetic instruction by prompting a generative model system including one or more machine-learned generative models with the instruction metadata as one or more constraints;
- generating a model response by prompting the generative model system with the metadata-conditioned synthetic instruction; and
- modifying the target sequence processing model based at least in part on a data pair including the metadata-conditioned synthetic instruction and the model response.

2. The computer-implemented method of claim 1, further comprising:
- generating at least one instruction-refinement action by prompting the generative model system with the instruction metadata as one or more constraints.

3. The computer-implemented method of claim 2, wherein:
- the metadata-conditioned synthetic instruction is a first metadata-conditioned synthetic instruction; and
- the method further comprises generating a plurality of metadata-conditioned synthetic instructions including the first metadata-conditioned synthetic instruction and a second metadata-conditioned synthetic instruction by prompting the generative model system with the instruction metadata as one or more constraints.

4. The computer-implemented method of claim 3, further comprising:
- generating a refined metadata-conditioned synthetic instruction by prompting the generative model system with the at least one instruction-refinement action and the second metadata-conditioned synthetic instruction.

5. The computer-implemented method of claim 4, wherein the model response is a first model response, the method further comprising:

generating a second model response by prompting the generative model system with the refined metadata-conditioned synthetic instruction.

6. The computer-implemented method of claim 5, further comprising:

generating a target model response by prompting the target sequence processing model with the second metadata-conditioned synthetic instruction; and determining a quality gap metric indicative of a difference in response quality between the second model response and the target model response.

7. The computer-implemented method of claim 6, wherein determining a quality gap metric indicative of a difference in response quality between the second model response and the target model response comprises:

generating a score for the second model response and a score for the target model response by prompting the generative model system with the target model response and the second model response.

8. The computer-implemented method of claim 7, further comprising:

determining that the quality gap satisfies one or more threshold criteria; and in response to determining that the quality gap satisfies one or more threshold criteria, modifying the target sequence processing model based at least in part on a data pair including the refined metadata-conditioned synthetic instruction and the second model response.

9. The computer-implemented method of claim 7, further comprising:

determining that the quality gap does not satisfy one or more threshold criteria; and in response to determining that the quality gap does not satisfy one or more threshold criteria, generating an additional refined metadata-conditioned synthetic instruction by prompting the generative model system with the at least one instruction-refinement action and the second metadata-conditioned synthetic instruction.

10. The computer-implemented method of claim 1, further comprising:

generating the instruction metadata by prompting the generative model system with one or more seed instructions.

11. The computer-implemented method of claim 10, wherein prompting the generative model system comprises:

encoding the one or more seed instructions into the instruction metadata using a first sequence processing model of the generative model system.

12. The computer-implemented method of claim 11, wherein generating the metadata-conditioned synthetic instruction comprises:

prompting a second sequence processing model of the generative model system with the instruction metadata as one or more constraints.

13. The computer-implemented method of claim 1, wherein modifying the target sequence processing model comprises:

fine-tuning the target sequence processing model.

14. The computer-implemented method of claim 1, wherein the instruction metadata includes concise keywords that capture a distribution from a set of seed instructions associated with the particular computing task.

15. The computer-implemented method of claim 1, wherein the instruction metadata includes a word-level abstraction of an input instruction distribution.

16. The computer-implemented method of claim 1, wherein the particular computing task is an instruction-following task.

17. The computer-implemented method of claim 1, wherein:

the target sequence processing model is a target large language model.

18. A system, comprising:

one or more processors; and one or more computer-readable storage media that store instructions that, when executed by the one or more processors, cause the one or more processors to perform operations, the operations comprising:

obtaining instruction metadata indicative of at least one use case and at least one skill associated with a particular computing task to be performed by a target sequence processing model;

generating a metadata-conditioned synthetic instruction by prompting a generative model system including one or more machine-learned generative models with the instruction metadata as one or more constraints;

generating a model response by prompting the generative model system with the metadata-conditioned synthetic instruction; and modifying the target sequence processing model based at least in part on a data pair including the metadata-conditioned synthetic instruction and the model response.

19. A computer-implemented method, comprising:

obtaining a set of instruction metadata including at least one use case and at least one skill associated with a particular instruction-following computing task;

generating at least one metadata-conditioned synthetic instruction by prompting a generative model system including one or more machine-learned generative models with the instruction metadata;

generating at least one instruction-refinement action by prompting the generative model system with the instruction metadata;

generating at least one refined metadata-conditioned synthetic instruction by prompting the generative model system with the at least one instruction-refinement action and the at least one metadata-conditioned synthetic instruction;

generating at least one response by prompting the generative model system with the at least one refined metadata-conditioned synthetic instruction; and modifying a target machine-learned model based at least in part on a data pair including the at least one refined metadata-conditioned synthetic instruction and the at least one response.

* * * * *